United States Patent
Ji et al.

(10) Patent No.: US 11,122,572 B2
(45) Date of Patent: Sep. 14, 2021

(54) SIGNAL TRANSMISSION METHOD AND APPARATUS

(71) Applicant: Huawei Technologies Co., Ltd., Shenzhen (CN)

(72) Inventors: Liuliu Ji, Shanghai (CN); Yi Huang, Shenzhen (CN); Yuanjie Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/504,010

(22) Filed: Jul. 5, 2019

(65) Prior Publication Data
US 2019/0373592 A1    Dec. 5, 2019

Related U.S. Application Data

(63) Continuation of application No. PCT/CN2018/071786, filed on Jan. 8, 2018.

(30) Foreign Application Priority Data

Jan. 6, 2017   (CN) .......................... 201710011409.7
Aug. 11, 2017  (CN) .......................... 201710687933.6

(51) Int. Cl.
*H04W 72/04*     (2009.01)
*H04L 5/00*      (2006.01)
*H04B 7/0452*    (2017.01)

(52) U.S. Cl.
CPC ......... *H04W 72/046* (2013.01); *H04L 5/0048* (2013.01); *H04W 72/042* (2013.01); *H04B 7/0452* (2013.01)

(58) Field of Classification Search
CPC .... H04B 7/022; H04B 7/0404; H04B 7/0408; H04B 7/0413; H04B 7/043; H04B 7/0452;
(Continued)

(56) References Cited

U.S. PATENT DOCUMENTS 10,194,334 B2 *  1/2019  Gustafsson .......... H04B 7/0617
10,284,278 B2 *  5/2019  Islam .................. H04B 7/0617
(Continued)

FOREIGN PATENT DOCUMENTS

CN    101110622 A    1/2008
CN    101471708 A    7/2009
(Continued)

OTHER PUBLICATIONS

"Beam grouping for beam management," 3GPP TSG RAN WG1 Meeting #86bis, Lisbon, Portugal, R1-1610437, 3rd Generation Partnership Project, Valbonne, France (Oct. 10-14, 2016).
(Continued)

*Primary Examiner* — Frank Duong
(74) *Attorney, Agent, or Firm* — Leydig, Voit & Mayer, Ltd.

(57) ABSTRACT

In a signal transmission method, a user equipment receives a first signal from a wireless network device; and the user equipment determines spatial information of a to-be-transmitted second signal based on the first signal, and transmits the to-be-transmitted second signal by using the spatial information. An uplink transmit beam is determined by using related information of a downlink receive beam, so that the UE can efficiently determine spatial information of an uplink signal to be transmitted by the UE.

18 Claims, 6 Drawing Sheets

(58) Field of Classification Search
CPC .. H04B 7/0617; H04B 7/0621; H04B 7/0626; H04B 7/063; H04B 7/086; H04B 7/088; H04L 5/0023; H04L 5/0048; H04J 11/0053; H04W 72/04; H04W 72/042; H04W 72/046

See application file for complete search history.

(56) References Cited

U.S. PATENT DOCUMENTS

| | | | |
|---|---|---|---|
| 10,367,677 B2 * | 7/2019 | Parkvall | H04B 7/0617 |
| 10,425,139 B2 * | 9/2019 | Guo | H04B 7/0695 |
| 2005/0101354 A1 | 5/2005 | Yang | |
| 2013/0072244 A1 | 3/2013 | Jeong et al. | |
| 2013/0279437 A1 | 10/2013 | Ng et al. | |
| 2014/0211731 A1 | 7/2014 | Inoue et al. | |
| 2014/0301302 A1 | 10/2014 | Xu et al. | |
| 2015/0009951 A1 | 1/2015 | Josiam et al. | |
| 2015/0365154 A1 * | 12/2015 | Davydov | H04B 7/0626 370/329 |
| 2017/0033854 A1 | 2/2017 | Yoo | |
| 2019/0260425 A1 * | 8/2019 | Ji | H04L 5/0091 |
| 2020/0344733 A1 * | 10/2020 | Park | H04L 5/0048 |

FOREIGN PATENT DOCUMENTS

| | | |
|---|---|---|
| CN | 102742312 A | 10/2012 |
| CN | 103634038 A | 3/2014 |
| CN | 104247291 A | 12/2014 |
| CN | 105122710 | 12/2015 |
| CN | 105637952 A | 6/2016 |
| CN | 106034307 A | 10/2016 |
| CN | 106134236 A | 11/2016 |
| CN | 201910730175.0 | 8/2020 |
| CN | 201710687933.6 | 2/2021 |
| JP | 2011050043 A | 3/2011 |
| JP | 2014530535 A | 11/2014 |
| JP | 2015514370 A | 5/2015 |
| JP | 2016026445 A | 2/2016 |
| JP | 2019-536957 | 9/2020 |
| KR | 20130029745 A | 3/2013 |
| WO | 2007001996 A1 | 1/2007 |
| WO | 2014101170 A1 | 7/2014 |
| WO | 2016005003 A1 | 1/2016 |
| WO | WO-2016/005003 * | 1/2016 |
| WO | 2016032104 A1 | 3/2016 |
| WO | 2016086144 A1 | 6/2016 |
| WO | WO-2016/086144 * | 6/2016 |
| WO | 2016195335 A1 | 12/2016 |

OTHER PUBLICATIONS

"3rd Generation Partnership Project; Technical Specification Group Radio Access Network; Evolved Universal Terrestrial Radio Access (E-UTRA); Physical layer procedures (Release 14)," 3GPP TS 36.213, V14.1.0, pp. 1-414, 3rd Generation Partnership Project, Valbonne, France (Dec. 2016).

"WF on Beam management," 3GPP TSG RAN WG1 Meeting #86bis, Lisbon, Portugal, R1-1610539, pp. 1-5, 3rd Generation Partnership Project, Valbonne, France (Oct. 10-14, 2016).

"Way Forward on QCL for NR," 3GPP TSG RAN WG1 Meeting #86-BIS, R1-1610513, pp. 1-2, 3rd Generation Partnership Project, Valbonne, France (Oct. 10-14, 2016).

"WF on the QCL for NR," 3GPP TSG RAN WG1 Meeting #86bis, Lisbon, Portugal, R1-1610520, pp. 1-2, 3rd Generation Partnership Project, Valbonne, France (Oct. 10-14, 2016).

"On the need of new QCL parameters in NR," 3GPP TSG RAN WG1 Meeting #86, Gothenburg, Sweden, R1-166563, pp. 1-4, 3rd Generation Partnership Project, Valbonne, France (Aug. 22-26, 2016).

"Discussion on Transmit Beam Coordination and QCL for NR," 3GPP TSG RAN WG1 Meeting #86, Gothenburg, Sweden, R1-166903, pp. 1-5, 3rd Generation Partnership Project, Valbonne, France (Aug. 22-26, 2016).

LG Electronics, "Discussion on QCL assumptions for NR," 3GPP TSG RAN WG1 Meeting #87, Reno, USA, R1-1611806, total 6 pages, 3rd Generation Partnership Project, Valbonne, France (Nov. 14-18, 2016).

Zte et al., "Discussion on UL MIMO transmission for NR," 3GPP TSG RAN WG1 Meeting #87, Reno, USA, R1-1611407, total 5 pages, 3rd Generation Partnership Project, Valbonne, France (Nov. 14-18, 2016).

Nokia et al., "Power Control for MIMO," 3GPP TSG-RAN WG1 Meeting #86bis, Lisbon, Portugal, R1-1610283, total 5 pages, 3rd Generation Partnership Project, Valbonne, France (Oct. 10-14, 2016).

Samsung et al., "WF on Beam Correspondence," 3GPP TSG RAN WG1 Meeting #87, Reno, USA, R1-1613542, total 5 pages 3rd Generation Partnership Project, Valbonne, France (Nov. 14-18, 2016).

* cited by examiner

SIGNAL TRANSMISSION METHOD AND APPARATUS

CROSS-REFERENCE TO RELATED APPLICATIONS

This application is a continuation of International Application No. PCT/CN2018/071786, filed on Jan. 8, 2018, which claims priority to Chinese Patent Application No. 201710011409.7, filed on Jan. 6, 2017 and Chinese Patent Application No. 201710687933.6, filed on Aug. 11, 2017, all of which are hereby incorporated by reference in their entireties.

TECHNICAL FIELD

This application relates to the field of communications technologies, and in particular, to a signal transmission method and apparatus.

BACKGROUND

FIG. 1 is a structural diagram of a communications system. The communications system includes a plurality of wireless network devices (for example, base stations) and a plurality of user equipments (UEs) within coverage of each network device.

Massive multiple input multiple output (Massive MIMO) can further increase a system capacity by using more spatial degrees of freedom, and therefore become a key technology in a new radio access technology (NR).

In NR, beam-based transmission becomes a focus. A high-resolution beam may be formed in NR based on a configuration of a massive antenna array.

In current research, a problem to be urgently resolved is to determine an uplink transmit beam (to be specific, spatial information or direction information of an uplink signal) based on which a UE transmits an uplink signal in uplink transmission.

SUMMARY

Embodiments of the present application provide a signal transmission method and apparatus, so that a UE efficiently determines spatial information of an uplink signal to be transmitted by the UE.

According to a first aspect, an embodiment of the present application provides a signal transmission method, including:

receiving, by a user equipment, a first signal from a first wireless network device; and determining, by the user equipment, spatial information of a to-be-transmitted second signal based on the first signal, and transmitting the to-be-transmitted second signal by using the spatial information.

Optionally, the user equipment receives first indication information from a second wireless network device, where the first indication information is used to indicate that a quasi-co-location relationship with respect to the spatial information exists between the second signal and the first signal, and the second wireless network device is the same as or different from the first wireless network device.

Optionally, the method further includes: receiving, by the user equipment, second indication information from a second wireless network device, where the second indication information is used to indicate that the first signal serves as a reference for the spatial information of the second signal, and the second wireless network device is the same as or different from the first wireless network device.

Optionally, the determining, by the user equipment, spatial information of a to-be-transmitted second signal based on the first signal includes: determining, by the user equipment, that the first signal is a reference signal for the spatial information of the second signal; and determining, by the user equipment, the spatial information of the to-be-transmitted second signal based on the first signal.

Optionally, the determining, by the user equipment, that the first signal is a reference signal for the spatial information of the second signal may specifically include: determining, by the user equipment, that the first signal has a feature of the reference signal for the spatial information of the second signal.

Optionally, the first signal may include one or more signals, and the second signal or a signal associated with the second signal may include one or more signals.

According to a second aspect, an embodiment of the present application provides a signal transmission method, including:

transmitting, by a first wireless network device, a first signal to a user equipment; and receiving, by the first wireless network device, a second signal from the user equipment, where the first signal is a reference for spatial information of the second signal.

Optionally, the first wireless network device transmits first indication information to the user equipment, where the first indication information is used to indicate that a quasi-co-location relationship with respect to the spatial information exists between the second signal and the first signal.

Optionally, a second wireless network device transmits first indication information to the user equipment, where the first indication information is used to indicate that a quasi-co-location relationship with respect to the spatial information exists between the second signal and the first signal.

Optionally, the method further includes: transmitting, by the first wireless network device, second indication information to the user equipment, where the second indication information is used to indicate that the first signal serves as the reference for the spatial information of the second signal; or transmitting, by the second wireless network device, second indication information to the user equipment, where the second indication information is used to indicate that the first signal serves as the reference for the spatial information of the second signal.

Optionally, that the first signal is a reference for spatial information of the second signal includes the first signal has a feature of a reference signal for the spatial information of the second signal.

With reference to the first aspect or the second aspect, optionally, the second wireless network device is a wireless network device serving the user equipment, and the first wireless network device is the serving wireless network device or a wireless network device different from the serving wireless network device.

Optionally, that the first indication information is used to indicate that a quasi-co-location relationship with respect to the spatial information exists between the second signal and the first signal includes:

the first indication information is used to indicate that a quasi-co-location relationship with respect to the spatial information exists between resource information of the second signal and resource information of the first signal, and the resource information includes at least one of resource identifier information, antenna port information, channel state information measurement setting identifier information, and process identifier information.

Optionally, the first signal includes a non-zero-power reference signal. For example, the non-zero-power reference signal included in the first signal is at least one of a non-zero-power reference signal used for obtaining channel state information, a non-zero-power reference signal used for demodulation, and a non-zero-power reference signal used for beam management.

Optionally, the second signal includes a reference signal. For example, the reference signal included in the second signal is at least one of a reference signal used for demodulation and a reference signal used for uplink channel measurement.

Optionally, the first indication information is included in a field used to indicate quasi-co-location information; or the first indication information is included in downlink control information, and the downlink control information further includes information used to indicate uplink scheduling related information; or the first indication information is included in a field used to indicate uplink scheduling related information.

Optionally, the second indication information is included in configuration information of the first signal. For example, the configuration information of the first signal includes at least one of a channel state information measurement setting field of the first signal, a process field of the first signal, a resource field of the first signal, an antenna port information field of the first signal, and a beam information field of the first signal.

Optionally, the second indication information includes several bits, the first signal corresponds to at least one of the several bits, and the at least one bit indicates that the first signal serves as the reference for the spatial information of the second signal. In this case, the second indication information may be included in the channel state information measurement setting field of the first signal or the process field of the first signal.

Optionally, the second indication information is a field with a Boolean value, or the second indication information exists only when being used to indicate that the first signal serves as the reference for the spatial information of the second signal. In this case, the second indication information may be included in at least one of the resource field of the first signal, the antenna port information field of the first signal, and the beam information field of the first signal.

Optionally, the feature of the reference signal for the spatial information of the second signal includes resource information of the signal, the resource information includes at least one of antenna port information, resource identifier information, channel state information measurement setting identifier information, and process identifier information, and the signal includes at least one of a downlink control signal, a non-zero-power reference signal, and a signal used for beam management.

Optionally, the spatial information of the second signal includes a transmit angle of the second signal, and the transmit angle of the second signal is determined based on an angle of arrival of the first signal.

Optionally, the method further includes:

determining, by the user equipment, a transmit power of a to-be-transmitted uplink signal based on a received power of the first signal; and transmitting, by the user equipment, the uplink signal based on the transmit power, where the uplink signal includes the second signal and/or a signal associated with the second signal; and/or adjusting, by the user equipment, an uplink transmission timing advance based on a variation of a receive time of the first signal; and transmitting, by the user equipment, an uplink signal based on the adjusted uplink transmission timing advance, where the uplink signal includes the second signal and/or a signal associated with the second signal.

The signal associated with the second signal may be a signal having a non-empty intersection between an antenna port of the signal and an antenna port of the second signal.

Optionally, the first signal may include one or more signals, and the second signal or the signal associated with the second signal may include one or more signals.

According to a third aspect, a signal transmission apparatus is further provided, where the apparatus may be a user equipment or a chip in a user equipment, and includes a processor, a memory, and a transceiver, where the memory is configured to store an instruction, the processor is configured to execute the instruction stored in the memory, to control the transceiver to receive and transmit signals, and when the processor executes the instruction stored in the memory, the user equipment is configured to implement any method used by the user equipment described in the first aspect.

According to a fourth aspect, a signal transmission apparatus is further provided, where the apparatus may be a wireless network device or a chip in a wireless network device, and includes a processor, a memory, and a transceiver, where the memory is configured to store an instruction, the processor is configured to execute the instruction stored in the memory, to control the transceiver to receive and transmit signals, and when the processor executes the instruction stored in the memory, the wireless network device is configured to implement any method used by the first wireless network device or the second wireless network device described in the second aspect.

According to a fifth aspect, a signal transmission apparatus is further provided, where the apparatus includes some modules, configured to implement any method used by the foregoing user equipment. Specific modules may correspond to steps of each method, and are not described again herein.

According to a sixth aspect, a signal transmission apparatus is further provided, where the apparatus includes some modules, configured to implement any method used by the foregoing first wireless network device or second wireless network device. Specific modules may correspond to steps of each method, and are not described again herein.

According to a seventh aspect, a computer storage medium is further provided, and is configured to store some instructions, where when the instructions are executed, any method used by the user equipment or the first or second wireless network device may be implemented.

According to an eighth aspect, a communications system is further provided, where the system includes the first wireless network device provided by the fourth aspect, and may further include the second wireless network device used in the second aspect, and may further include the user equipment provided by the third aspect.

According to a ninth aspect, a communications apparatus is further provided, where the apparatus has functions for implementing actions of the first or second wireless network device or the user equipment in the foregoing method aspect, and includes corresponding components configured to perform steps or functions described in the foregoing method aspect. The steps or functions may be implemented by software or hardware, or implemented by a combination of hardware or software.

In a possible design, the communications apparatus includes one or more processors and a transceiver unit. The one or more processors are configured to support the first or second wireless network device or a user equipment in performing corresponding functions in the foregoing method, for example, determining spatial information of a to-be-transmitted second signal based on a first signal. The transceiver unit is configured to support the first or second wireless network device or a user equipment in communicating with another device, and implementing a receiving/transmission function, for example, receiving a first signal and transmitting a second signal, or transmitting a first signal, and receiving a second signal.

Optionally, the communications apparatus may further include one or more memories. The memory is coupled with the processor. The memory stores a program instruction and data required by the communications apparatus. The one or more memories may be integrated with the processor, or may be disposed separately from the processor. This is not limited in this application.

The communications apparatus may be a base station, a transmission and reception point (TRP), or a user equipment (or may be a terminal device). The transceiver unit may be a transceiver, or a transceiver circuit.

The communications apparatus may also be a communications chip. The transceiver unit may be an input/output circuit or an interface of the communications chip.

According to the method, apparatus, and system provided by embodiments of the present application, an uplink transmit beam is determined by using related information of a downlink receive beam, so that the UE can efficiently determine spatial information of an uplink signal to be transmitted by the UE.

For ease of understanding, some descriptions of related concepts of this application are provided for reference by using an example, as shown below:

The 3rd Generation Partnership Project (3GPP) is a project dedicated to developing a wireless communications network. Usually, a 3GPP-related organization is referred to as a 3GPP organization.

A wireless communications network is a network providing wireless communication functions. The wireless communications network may use different communications technologies, for example, Code Division Multiple Access (CDMA), Wideband Code Division Multiple Access (WCDMA), Time Division Multiple Access (TDMA), Frequency Division Multiple Access (FDMA), Orthogonal Frequency-Division Multiple Access (OFDMA), Single Carrier Frequency-Division Multiple Access (SC-FDMA), and Carrier Sense Multiple Access with Collision Avoidance. Based on factors such as capacities, rates, or delays of different networks, networks may be classified into 2G networks, 3G networks, 4G networks, or future evolved networks, such as 5G networks. A typical 2G network includes a Global System for Mobile Communications (GSM) network or a general packet radio service (GPRS) network. A typical 3G network includes a Universal Mobile Telecommunications System (UMTS) network. A typical 4G network includes a Long Term Evolution (LTE) network. Sometimes the UMTS network may also be referred to as a universal terrestrial radio access network (UTRAN). Sometimes the LTE network may also be referred to as an evolved universal terrestrial radio access network (E-UTRAN). Based on different resource allocation modes, networks may be classified into cellular communications networks and wireless local area networks (WLAN), where the cellular communications networks are dominated by scheduling, and the WLANs are dominated by contention. The foregoing 2G, 3G, and 4G networks are all cellular communications networks. A person skilled in the art should know that technical solutions provided by embodiments of the present application may be applied to a wireless communications network after 4G, for example, a 4.5G or 5G network, or another non-cellular communications network. For brevity, sometimes the wireless communications network may be referred to as a network for short in embodiments of the present application.

The cellular communications network is one of wireless communications networks. The cellular communications network uses a cellular wireless networking mode to connect terminal devices to a network device by using radio channels, and further implements mutual communication between users in activities. A main feature of the cellular communications network is that a terminal has mobility and has functions of inter-cell handover and automatic roaming between local networks.

FDD: frequency division duplex.

TDD: time division duplex.

A user equipment (UE) is a terminal device, and may be a mobile terminal device or may be a non-mobile terminal device. The device is configured to receive or transmit service data. The user equipment may be distributed in a network. The user equipment has different names in different networks, for example, a terminal, a mobile station, a subscriber unit, a station, a cellular phone, a personal digital assistant, a wireless modem, a wireless communications device, a handheld device, a laptop computer, a cordless phone, a wireless local loop station, an in-vehicle terminal, an unmanned aerial vehicle, a smart household, and an Internet of Things device. The user equipment may communicate with one or more core networks through a radio access network (RAN) (an access part of a wireless communications network), for example, exchange voice and/or data with the radio access network.

A base station (BS) device, also referred to as a base station, is an apparatus deployed in the radio access network and configured to provide a wireless communication function. For example, in a 2G network, devices providing base station functions include a base wireless transceiver station (base transceiver station, BTS) and a base station controller (BSC); in a 3G network, devices providing base station functions include a NodeB and a radio network controller (RNC); in a 4G network, devices providing base station functions include an evolved NodeB (eNB); in a WLAN, a device providing base station functions is an access point (AP). Devices providing base station functions in future 5G new radio (NR) include a further evolved NodeB (gNB), a transmission and reception point (TRP), a transmission point (TP), a relay, and the like. The NodeB, the TRP, and the TP may be apparatuses including a baseband processing part and a radio frequency part. The TRP and the TP may be a radio unit (RU) or a remote radio unit (RRU). The TRP is a common name in NG, and the TP is a common name in an LTE system.

A wireless device is a device that is located in a wireless communications network and can communicate in a wireless mode. The device may be a wireless network device, for example, a base station, or may be a user equipment, or may be another network element.

A network-side device is a device that is located in a wireless communications network and located on a network side, may be a network element of an access network, for example, a base station or a controller (if available), or may be a network element of a core network, or may be another network element.

NR (new radio) is a new generation radio access network technology, and may be applied to a future evolved network, such as a 5G network.

A wireless local area network (WLAN) is a local area network using a radio wave as a data transmission medium, where a transmission distance is generally several scores of meters.

An access point (AP) is connected to a wireless network, or may be connected to a device in a wired network. The AP can serve as an intermediate point, so that devices that go online in a wired or wireless mode can be interconnected and transmit data to each other.

Radio resource control (RRC) processes layer-3 information of a control plane between a UE and a network-side device, and usually includes at least one of the following functions:

broadcasting information provided by a non-access stratum of a core network, where RRC is responsible for broadcasting network system information to the UE; and the system information is usually repeated according to a basic rule, and RRC is responsible for performing planning, segmentation, and repetition, and also supports broadcasting of upper-layer information;

associating broadcast information to an access stratum, where RRC is responsible for broadcasting network system information to the UE; and the system information is usually repeated according to a basic rule, and RRC is responsible for performing planning, segmentation, and repetition; and establishing, re-establishing, maintaining, and releasing an RRC connection between the UE and the network-side device, where to establish a first signal connection of the UE, a higher layer of the UE requests to establish an RRC connection; an RRC connection establishment process includes steps of reselecting an available cell, controlling access permission, and establishing a layer-2 signal link; RRC connection release is also requested by a higher layer, and is used to tear down a last signal connection, or is initiated by an RRC layer when an RRC link fails; and if a connection fails, the UE requests to re-establish an RRC connection; or if an RRC connection fails, RRC releases an allocated resource.

The foregoing descriptions about RRC are merely examples, and may change with evolution of networks.

DESCRIPTION OF EMBODIMENTS

Figure 1:
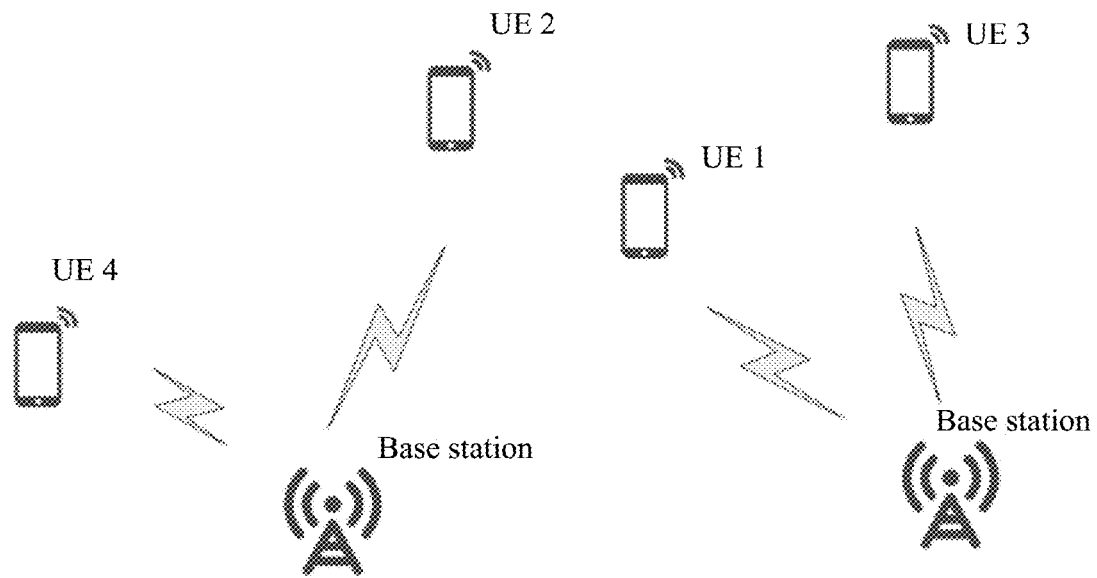
FIG. 1 is a schematic diagram of a communications system (only a base station and a UE are shown)

The following describes technical solutions in embodiments of the present application with reference to the accompanying drawings. The described embodiments are merely a part rather than all of the embodiments of this application. All other embodiments obtained by a person of ordinary skill in the art based on the described embodiments of this application without creative efforts may fall within the protection scope of this application.

Terms such as "component", "module", and "system" used in this application are used to indicate computer-related entities. The computer-related entities may be hardware, firmware, combinations of hardware and software, software, or software in running. For example, a component may be, but is not limited to, a process that runs on a processor, a processor, an object, an executable file, a thread of execution, a program, and/or a computer. As an example, both a computing device and an application that runs on the computing device may be components. One or more components may reside within a process and/or a thread of execution, and the components may be located on one computer and/or distributed between two or more computers. In addition, these components may be executed from various computer-readable media that have various data structures. These components may communicate by using a local and/or remote process and according to, for example, a signal having one or more data packets (for example, data from one component, where the component interacts with another component in a local system or a distributed system, and/or interacts with other systems via a network such as the Internet by using a signal).

In addition, each aspect is described with reference to a wireless device in this application. The wireless device may be a wireless network device, or may be a terminal device. The wireless network device may be a base station. The base station may be configured to communicate with one or more user equipments, or may be configured to communicate with one or more base stations having a user equipment function (for example, communication between a macro base station and a micro base station, such as an access point). The wireless device may also be a user equipment, and the user equipment may be configured to communicate with one or more user equipments (for example, D2D communication), or may be configured to communicate with one or more base stations. The user equipment may also be referred to as a user terminal, and may include some or all of functions of a system, a subscriber unit, a subscriber station, a mobile station, a mobile wireless terminal, a mobile device, a node, a device, a remote station, a remote terminal, a terminal, a wireless communications device, a wireless communications apparatus, or a user agent. The user equipment may be a cellular phone, a cordless phone, a Session Initiation Protocol (SIP) phone, a smartphone, a wireless local loop (WLL) station, a personal digital assistant (PDA), a laptop computer, a handheld communications device, a handheld computing device, a satellite wireless device, a wireless modem card, an in-vehicle device, a smart household, an unmanned aerial vehicle, an Internet of Things device, and/or another processing device configured to perform communication in a wireless system. The base station may also be referred to as an access point, a node, a NodeB, an evolved NodeB (eNB), a TRP, a TP, a gNB, or another network entity, and may include some or all of functions of the foregoing network entities. The base station may communicate with a wireless terminal through an air interface. The communication may be performed by using one or more sectors. By converting a received air interface frame into an IP packet, the base station may be used as a router between a wireless terminal and other parts of an access network, where the access network includes an Internet Protocol (IP) network. The base station may further coordinate management of air interface attributes, and may further act as a gateway between a wired network and a wireless network. For example, the base station may be an evolved NodeB (eNB), a radio network controller (RNC), a NodeB (NB), a base station controller (BSC), a base transceiver station (BTS), a home NodeB (for example, a home evolved NodeB, or a home NodeB, HNB), a baseband unit (BBU), an access point (AP) in a Wireless Fidelity (Wi-Fi) system, a wireless relay node, a wireless backhaul node, a transmission point (transmission and reception point, TRP, or transmission point, TP), or the like, or may be a gNB or a transmission point (TRP or TP) in a 5G system such as NR, or an antenna panel or a group (including multiple antenna panels) of antenna panels of a base station in a 5G system, or may be a network node forming a gNB or a transmission point, such as a baseband unit (BBU) or a distributed unit (DU). In some deployments, the gNB may include a centralized unit (CU) and a DU. The gNB may further include a radio unit (RU). The CU implements some functions of the gNB, and the DU implements some functions of the gNB. For example, the CU implements functions of radio resource control (RRC) and Packet Data Convergence Protocol (PDCP) layers, and the DU implements functions of radio link control (RLC), Media Access Control (MAC), and physical (PHY) layers. Because RRC layer information is finally changed into PHY layer information, or is changed from PHY layer information, in this architecture, it may also be considered that higher layer signaling such as RRC layer signaling or PHCP layer signaling is transmitted by the DU, or transmitted by the DU and the RU. It may be understood that, the network device may be a CU node, or a DU node, or a device including a CU node and a DU node. In addition, the CU may be categorized as a network device in a radio access network (RAN), or the CU may be categorized as a network device in a core network CN. This is not limited herein.

In embodiments of the present application, the TRP and communication between the TRP and a UE are used as examples for description. It may be understood that, technical solutions provided by embodiments of the present application may also be applied to communication between UEs (for example, a device to device, device to device, D2D communication scenario), or may be applied to communication between base stations (for example, a macro base station and a micro base station), or may be applied to another network device than the TRP.

Aspects, embodiments, or features are presented in this application by describing a system that may include multiple devices, components, modules, and the like. It should be appreciated and understood that, each system may include another device, component, module, and the like, and/or may not include all devices, components, modules, and the like discussed with reference to the accompany drawings. In addition, a combination of these solutions may be used.

In addition, the word "example" in embodiments of the present application is used to represent giving an example, an illustration, or a description. Any embodiment or design scheme described as an "example" or "exemplary" in this application should not be interpreted as being more preferred or having more advantages than another embodiment or design scheme. "For example" is used to present a concept by giving an example.

In embodiments of the present application, "information", "signal", "message", and "channel" may be used interchangeably sometimes. It should be noted that expressed meanings are consistent when differences are not emphasized. "Of", "corresponding", and "relevant" may be used interchangeably sometimes. It should be noted that expressed meanings are consistent when differences are not emphasized.

In embodiments of the present application, a subscript such as $W_1$ may be written in a non-subscript form such as W1 sometimes, and expressed meanings are consistent when differences are not emphasized.

Network architectures and service scenarios described in embodiments of the present application are intended to describe technical solutions in embodiments of the present application more clearly, and do not constitute any limitation as to technical solutions provided by embodiments of the present application. A person of ordinary skill in the art may know that, with evolution of a network architecture and emergence of a new service scenario, technical solutions provided by embodiments of the present application are also applicable to similar technical problems.

Embodiments of the present application may be applied to both a time division duplex (TDD) scenario and a frequency division duplex (FDD) scenario.

Embodiments of the present application may be further applied to a UE-centric communication scenario in addition to some existing communication scenarios.

Optionally, in a future UE-centric network, a non-cell network architecture is introduced. To be specific, a large quantity of small cells are deployed in a specific area to form a super cell (hyper cell), where each small cell is a transmission point (TP) or a TRP of the hyper cell, and is connected to a centralized controller.

Optionally, in a UE-centric system, a UE may periodically transmit an uplink measurement reference signal. After receiving the reference signal transmitted by the UE, a network-side device may select an optimal TP and/or TRP set (sub-cluster) for the UE to serve the UE. When the UE moves within the hyper cell, the network-side device always selects a new sub-cluster for the UE to serve the UE, to avoid a real cell handover and implement service continuity of the UE. The network-side device includes a wireless network device.

Some scenarios in embodiments of the present application are described by using a 4G network scenario in a wireless communications network as an example. It should be noted that, solutions in embodiments of the present application may be further applied to another wireless communications network, and corresponding names may also be replaced with names of corresponding functions in the another wireless communications network.

FIG. 1 is a schematic structural diagram of a communications system. The communications system may include a core network, an access network, and a terminal. FIG. 1 shows only wireless network devices included in the access network, such as base stations and UEs.

Figure 2:
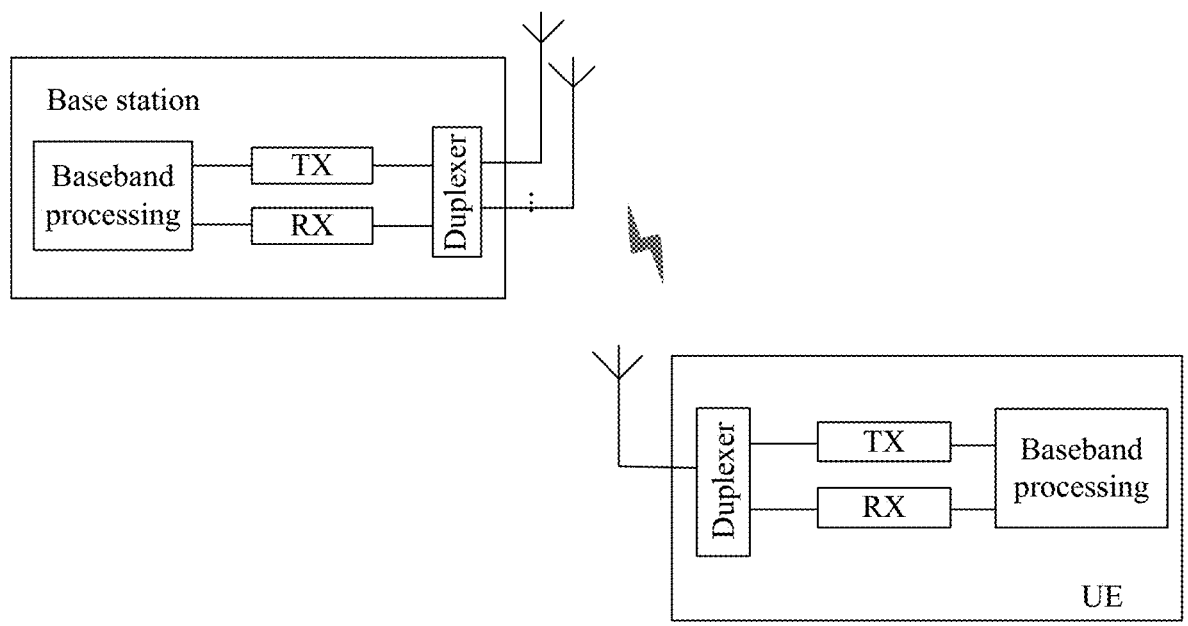
FIG. 2 is a simplified schematic diagram of internal structures of a base station and a UE described in an embodiment of the present application.

FIG. 2 is a simplified schematic diagram of internal structures of a base station and a UE.

The base station used as an example may include an antenna array, a duplexer, a transmitter (TX) and a receiver (RX) (the TX and RX are collectively referred to as a transceiver (TRX) sometimes), and a baseband processing part. The duplexer is configured to implement use of an antenna array for transmitting a signal and receiving a signal. The TX is configured to implement conversion between a radio frequency signal and a baseband signal. Usually the TX may include a power amplifier (PA), a digital-to-analog converter (DAC) and a frequency converter. Usually the RX may include a low noise amplifier (LNA), an analog-to-digital converter (ADC), and a frequency converter. The baseband processing part is configured to implement processing of the transmitted or received signal, for example, layer mapping, precoding, modulation/demodulation, and coding/decoding, and perform separate processing on a physical control channel, a physical data channel, a physical broadcast channel, a reference signal, and the like.

In an example, the base station may further include a control part, configured to perform multi-user scheduling and resource allocation, pilot scheduling, physical layer parameter configurations for the UE, and the like.

The UE used as an example may include an antenna, a duplexer, a transmitter (TX) and a receiver (RX) (the TX and RX are collectively referred to as a transceiver TRX sometimes), and a baseband processing part. In FIG. 2, the UE has a single antenna. It may be understood that, the UE may also have multiple antennas (to be specific, an antenna array).

The duplexer is configured to implement use of an antenna array for transmitting a signal and receiving a signal. The TX is configured to implement conversion between a radio frequency signal and a baseband signal. Usually the TX may include a power amplifier (PA), a digital-to-analog converter (DAC) and a frequency converter. Usually the RX may include a low noise amplifier (LNA), an analog-to-digital converter (ADC), and a frequency converter. The baseband processing part is configured to implement processing of the transmitted or received signal, for example, layer mapping, precoding, modulation/demodulation, and coding/decoding, and perform separate processing on a physical control channel, a physical data channel, a physical broadcast channel, a reference signal, and the like.

In an example, the UE may also include a control part, configured to request an uplink physical resource, calculate channel state information (CSI) corresponding to a downlink channel, determine whether a downlink data packet is received successfully, and the like.

In current 5G research, beam alignment on a TRP side and a UE side is a critical problem.

A beam means that directivity of energy of a transmitted and/or received signal is achieved (that is, the energy is accumulated in a direction) by adjusting a weight of an antenna (port), and the accumulation is referred to as a beam. A beam corresponding to the transmitted signal is a transmit beam, and a beam corresponding to the received signal is a receive beam. The transmit beam and the receive beam may be referred to as a beam pair.

As learned from an NR discussion process, beams in NR are classified into beams on a TRP side and beams on a UE side. Both the TRP and the UE may form digital beams by performing baseband precoding and form analog beams by using a phase shifter on radio frequencies respectively. Because a massive MIMO technology may be applied in NR, a large quantity of antennas may cause a formed beam to be very narrow and have a very high resolution. Therefore, directivity of the beam is more obvious. Therefore, a requirement is imposed on alignment of a transmit beam and a receive beam (beam alignment for short).

A current discussion on beam alignment mainly focuses on a downlink. Generally several beam pairs are obtained by beam sweeping. Downlink beam sweeping may be as follows: The TRP forms and transmits a plurality of downlink beams (also referred to as downlink transmit beams). The UE receives the plurality of downlink beams, and in a process of receiving the plurality of downlink beams by the UE, the UE may form a plurality of downlink receive beams (also referred to as downlink beams) by phase shifting of a phase shifter and/or by adjusting weights of antenna ports in a baseband. In this way, an optimal downlink beam pair is determined by sweeping and measuring the plurality of downlink transmit beams and the plurality of downlink receive beams, where the downlink beam pair includes a pair of a downlink transmit beam (TRP side) and a downlink receive beam (UE side). Further, the downlink transmit beam and the downlink receive beam are determined.

Similarly, the UE transmits a plurality of uplink beams (also referred to as uplink transmit beams). The TRP receives the plurality of uplink beams, and in a process of receiving the plurality of uplink beams by the TRP, the TRP may form a plurality of uplink receive beams by phase shifting of a phase shifter and/or adjusting weights of antenna ports in a baseband. In this way, an optimal uplink beam pair may be determined by sweeping and measuring the plurality of uplink transmit beams (also referred to as uplink beams) and the plurality of uplink receive beams (also referred to as uplink beams), where the uplink beam pair includes a pair of an uplink transmit beam (UE side) and an uplink receive beam (TRP side).

Figure 3A:
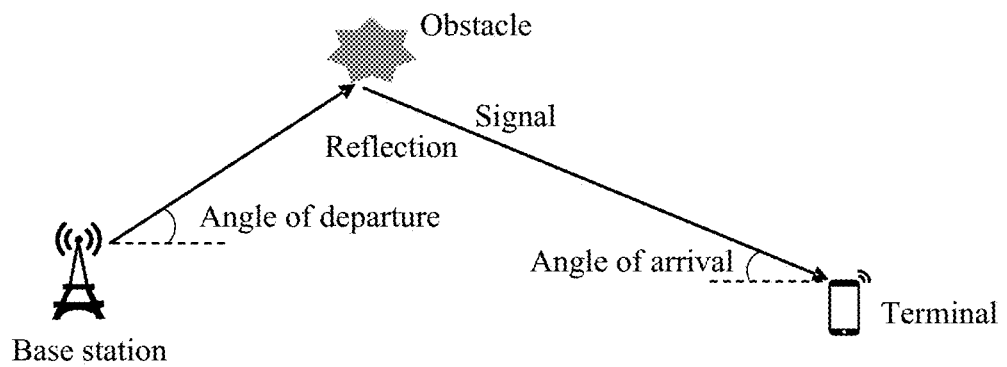
FIG. 3a and FIG. 3b are schematic diagrams of transmit angles and receive angles described in an embodiment of the present application.
Figure 3B:
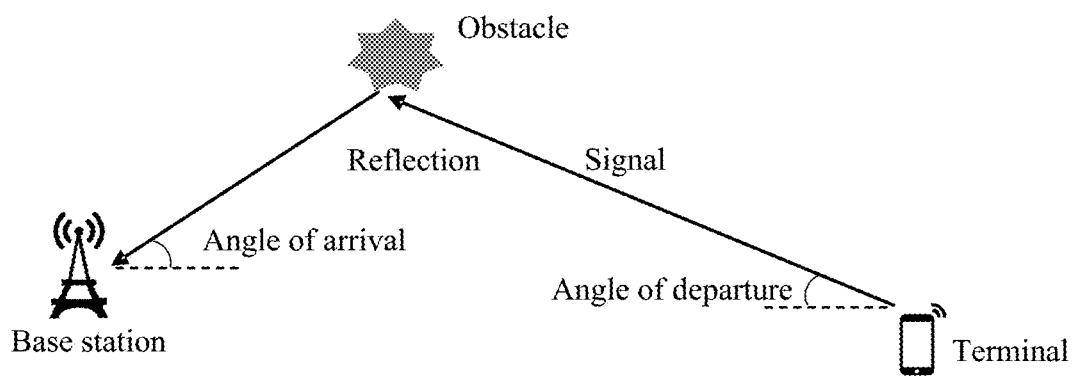

However, in this manner of determining an uplink beam pair, sweeping and measuring need to be performed between the UE and the TRP for a plurality of times. In this application, a manner of determining an uplink transmit beam is provided. To be specific, by using spatial reciprocity of beams, it is defined that a transmit angle (angle of departure, AoD) of an uplink transmit beam may be inferred based on an angle of arrival (AoA) of a downlink receive beam. In other words, the transmit angle of the uplink transmit beam may be determined based on the angle of arrival of the downlink receive beam, and may be specifically determined based on a relationship between the transmit angle of the uplink transmit beam and the angle of arrival of the downlink receive beam. For example, the relationship may be that the transmit angle of the uplink transmit beam is the same as the angle of arrival of the downlink receive beam. It may be understood that, for the relationship, other cases may also exist. For example, the relationship may be specified in advance by a protocol and pre-stored on the UE side, or may be configured by the TRP. This is not limited herein. Therefore, the UE can determine a corresponding uplink transmit beam after determining a downlink receive beam. FIG. 3a and FIG. 3b are schematic diagrams of transmit angles and angles of arrival. The angle of arrival (AoA) is an included angle between a direction of arrival of a signal and a direction (such as a horizontal direction). The transmit angle is also referred to as an angle of departure (AoD), and is an included angle between a direction of departure of a signal and a direction (such as a horizontal direction). When there are a plurality of paths, refer to an algorithm for specifically measuring and estimating an AoA/AoD by the UE. FIG. 3a and FIG. 3b show a strongest path in a plurality of paths as an example.

In addition, an angle of arrival of an uplink receive beam on the TRP side may also be related to a transmit angle of a downlink transmit beam on the TRP side. To be specific, the angle of arrival of the uplink receive beam on the TRP side may also be determined based on the transmit angle of the downlink transmit beam on the TRP side, and specifically may be determined based on a relationship between the angle of arrival of the uplink receive beam on the TRP side and the transmit angle of the downlink transmit beam on the TRP side. For example, the relationship may be that the transmit angle of the downlink transmit beam is the same as the angle of arrival of the uplink receive beam. It may be understood that, for the relationship, other cases may also exist. For example, the relationship may be specified in advance by a protocol and pre-stored on the TRP side, or may be configured by the TRP. This is not limited herein.

Therefore, the transmit angle of the uplink transmit beam and the angle of arrival of the uplink receive beam can be determined in a relatively simple manner.

Figure 4:
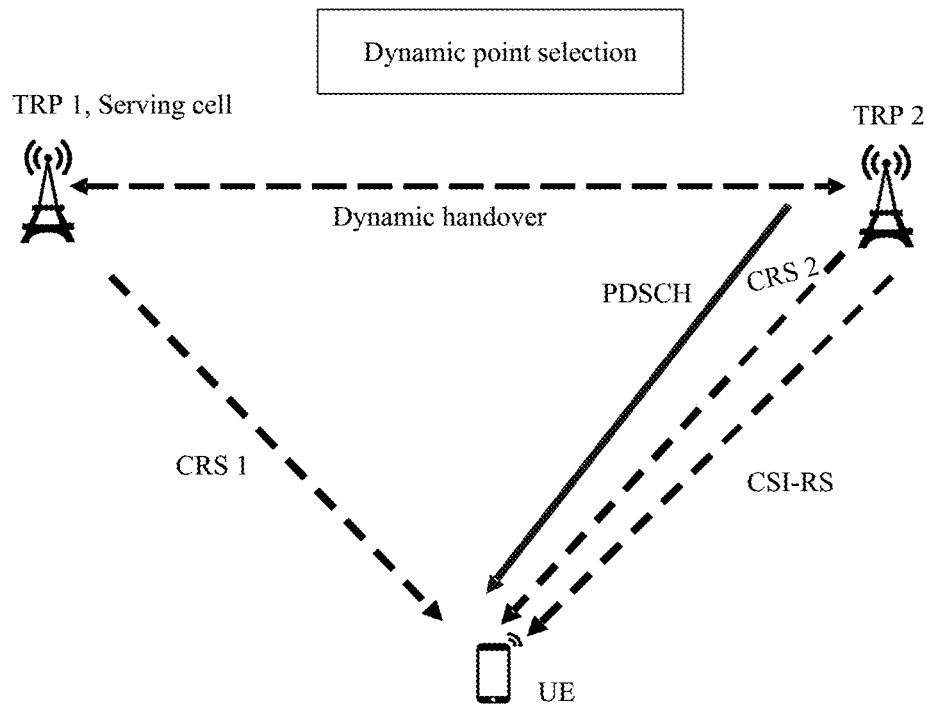
FIG. 4 is a schematic diagram of a dynamic point selection (DPS) scenario according to an embodiment of the present application.

However, in NR communication, a case in which the UE receives a plurality of downlink beams may exist. In this case, the UE has angles of arrival of a plurality of downlink receive beams. How the UE determines a transmit angle of an uplink transmit beam by referring to an angle of arrival of a specific downlink receive beam, or how the UE determines to select one of uplink transmit beams that are obtained by sweeping and measuring, needs to be further discussed. For example, a scenario in which the UE receives a plurality of downlink beams includes a MIMO application of a single base station, or some communication scenarios, such as a coordinated multi-point (CoMP) scenario, such as joint transmission (JT) or dynamic point selection (DPS), or a multi-panel communication scenario, or the like. FIG. 4 is a schematic diagram of a DPS scenario. In this scenario, a UE receives downlink data from only one TRP at a time, such as a signal on a physical downlink shared channel (PDSCH). To be specific, the UE dynamically receives beams from a plurality of TRPs. However, the UE should feedback uplink channel state information to a serving cell to maintain communication with the serving cell, instead of transmitting the uplink channel state information to a coordinating cell. Therefore, if the UE determines an uplink transmission direction based on a beam direction of downlink data that is being transmitted, a problem that the serving cell that needs to receive the uplink channel state information cannot receive a signal may occur. Therefore, in this scenario, a downlink resource to be referenced in uplink transmission needs to be indicated to the UE, to avoid a loss of gains of an uplink transmit beam or even a problem of communication interruption.

In a possible manner, the UE and the TRP form a plurality of uplink beam pairs by sweeping and measuring uplink beams. The TRP delivers resource information of an uplink signal to be transmitted by the UE, for example, an antenna port number of a reference signal, and/or resource information of an uplink receive beam of an uplink signal to be received by the TRP. In this way, the UE can determine, based on the information, an uplink transmit beam corresponding to the uplink signal to be transmitted by the UE, and/or the TRP can determine, based on the information, an uplink receive beam corresponding to the uplink signal to be received by the TRP.

An embodiment of the present application provides another possible manner: The UE determines, based on a downlink signal received from the TRP, an uplink transmit beam corresponding to an uplink signal to be transmitted by the UE.

The manner provided by this embodiment of the present application may be applied not only to a case in which the TRP and the UE have downlink beam pairs and do not obtain uplink beam pairs by performing sweeping or measuring, but also to a case in which the TRP and the UE have downlink beam pairs and obtain uplink beam pairs by performing sweeping or measuring.

Figure 5A:
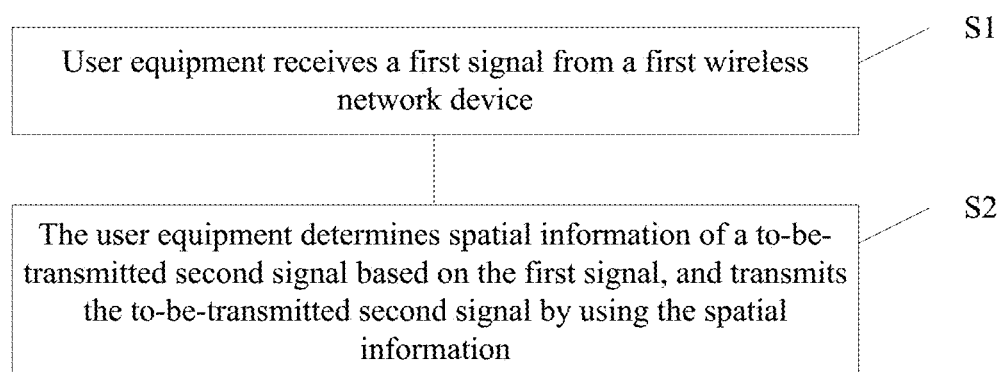
FIG. 5a, FIG. 5b, FIG. 5c, and FIG. 5d are schematic flowcharts of a signal transmission method according to an embodiment of the present application.

A possible solution, as shown in FIG. 5a, includes the following steps.

S1. A user equipment receives a first signal from a first wireless network device.

S2. The user equipment determines spatial information of a to-be-transmitted second signal based on the first signal, and transmits the to-be-transmitted second signal by using the spatial information.

Optionally, the spatial information of the second signal includes a transmit angle (angle of departure) of the second signal, and the transmit angle of the second signal is determined based on an angle of arrival of the first signal.

It may be understood that, that the transmit angle of the second signal is determined based on an angle of arrival of the first signal may include:

the transmit angle of the second signal is the same as the angle of arrival of the first signal; or a correspondence exists between the transmit angle of the second signal and the angle of arrival of the first signal; or a transmit angle of an uplink beam is selected from an existing uplink beam pair based on the angle of arrival of the first signal, as the transmit angle of the second signal. For example, a transmit angle of an uplink beam closest to the angle of arrival of the first signal is selected as the transmit angle of the second signal.

Figure 5B:
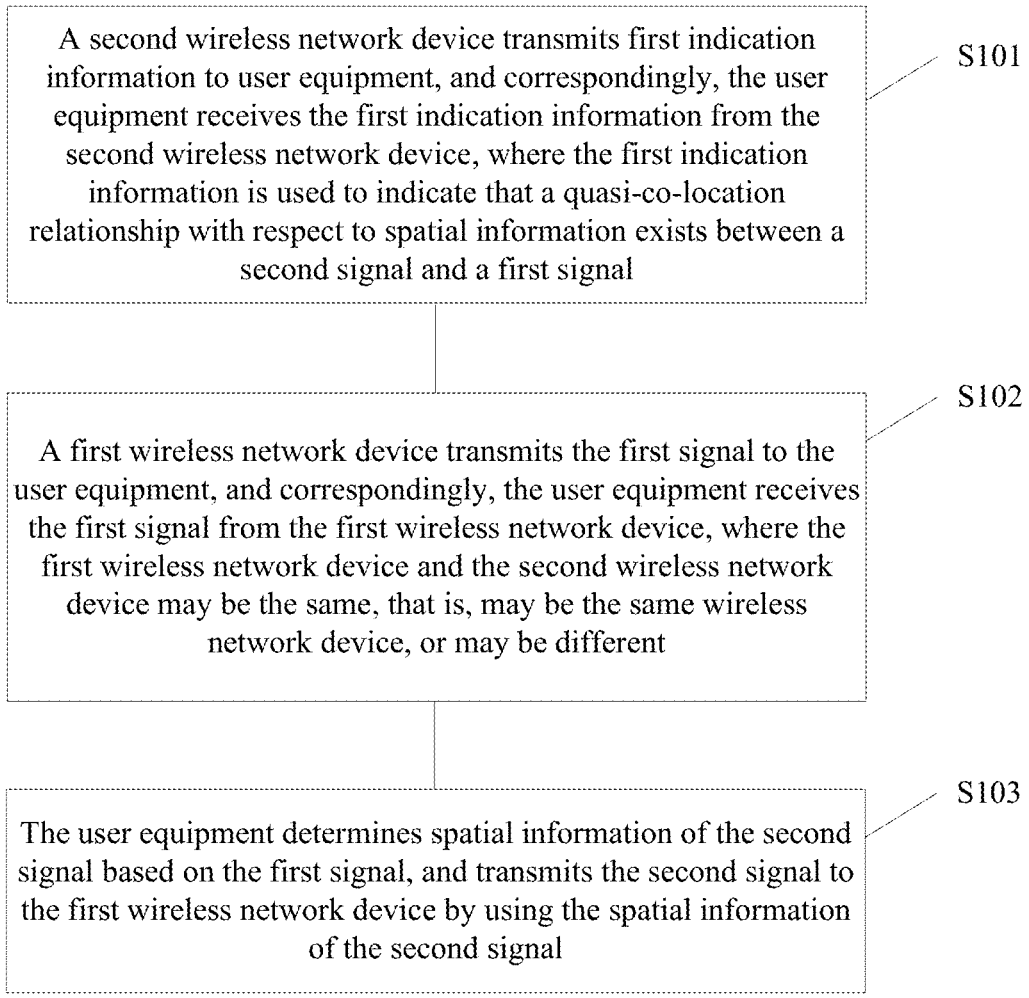
Figure 5C:
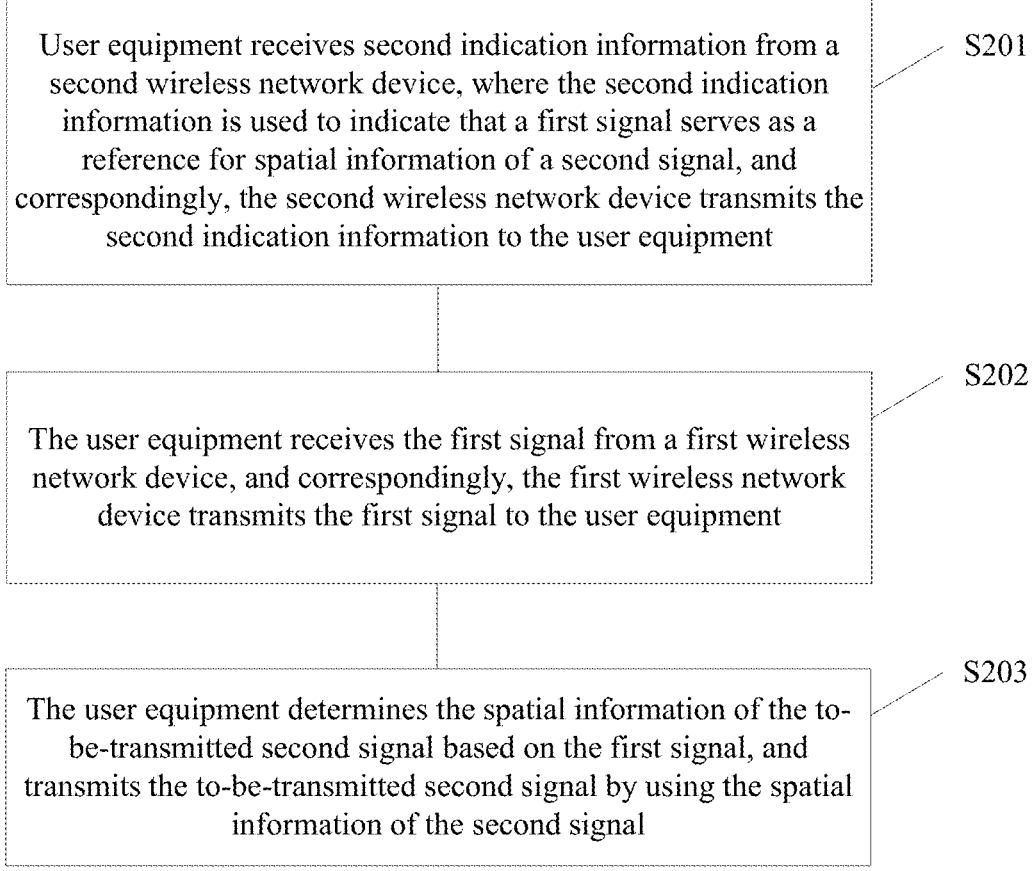
Figure 5D:
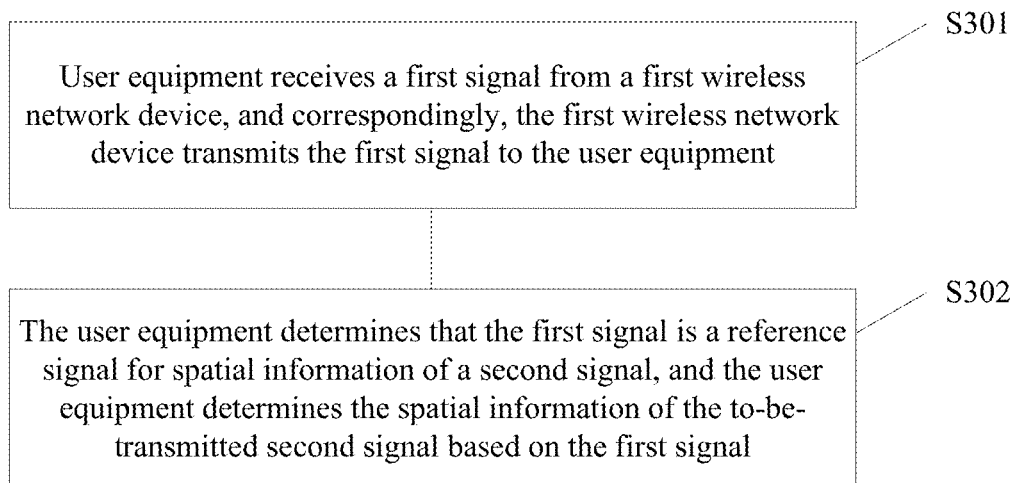

Optionally, an implementation shown in any one of FIG. 5b, FIG. 5c, and FIG. 5d is available, and is described in detail hereinafter.

The implementation shown in FIG. 5b includes the following steps.

S101. A second wireless network device transmits first indication information to a user equipment, and correspondingly, the user equipment receives the first indication information from the second wireless network device, where the first indication information is used to indicate that a quasi-co-location relationship with respect to spatial information exists between a second signal and a first signal.

That a quasi-co-location relationship with respect to spatial information exists between a second signal and a first signal may mean:

spatial information of the second signal may be inferred from spatial information of the first signal, where the spatial information may include at least one of a receive angle of arrival (AoA, also referred to as an angle of arrival or a receive angle), a transmit angle of departure (AoD, also referred to as an angle of departure or a transmit angle), an angle of arrival spread, an angle of departure spread, and spatial correlation.

Optionally, that a quasi-co-location relationship with respect to spatial information exists between a second signal and a first signal includes:

a quasi-co-location relationship with respect to the spatial information exists between resource information of the second signal and resource information of the first signal, that is, spatial information of the resource information of the second signal may be inferred from spatial information of the resource information of the first signal, where the resource information includes at least one of resource identifier information, antenna port information, channel state information measurement setting identifier information, and process identifier information.

Optionally, the first indication information may be delivered by using higher layer signaling or physical layer signaling.

Optionally, the first signal includes a non-zero-power reference signal.

Optionally, the non-zero-power reference signal included in the first signal is at least one of a non-zero-power reference signal used for obtaining channel state information, a non-zero-power reference signal used for demodulation, a non-zero-power reference signal used for beam management, a synchronization signal, and a tracking reference signal (tracking RS) used for time and frequency synchronization and tracking. For example, in an LTE system, a reference signal used for obtaining channel state information may be a channel state information-reference signal (CSI-RS), and a reference signal used for demodulation may be a demodulation reference signal (DMRS). In an NR system, a reference signal used for obtaining channel state information may be a CSI-RS, or may be another reference signal having a function of obtaining channel state information; a reference signal used for demodulation may be a DMRS, or may be another reference signal having a function of demodulation; a reference signal used for beam management may be a beam management reference signal (BMRS), and the reference signal used for beam management may be used for measuring a large-scale property of a beam, and further used for beam sweeping, alignment, and modification. For example, gains in the large-scale property are measured, and a beam pair with largest gains is used as a pair of beams.

Optionally, the second signal includes a reference signal. The reference signal may be a non-zero-power reference signal or may be a zero power reference signal.

Optionally, the reference signal included in the second signal is at least one of a reference signal used for demodulation and a reference signal used for uplink channel measurement. For example, in the LTE system, a reference signal used for demodulation may be a DMRS, and a reference signal used for uplink channel measurement may be a sounding reference signal (SRS). In the NR system, a reference signal used for demodulation may be a DMRS, or may be another reference signal having a function of demodulation; and a reference signal used for uplink channel measurement may be an SRS, or may be another reference signal having a function of uplink channel measurement.

In an optional manner, the first indication information may be included in a field used to indicate quasi-co-location information, for example, a physical downlink shared channel resource element mapping and quasi-co-location indicator field (PQI) in the LTE system.

To support coordinated multipoint transmission, in the 3rd Generation Partnership Project (3GPP) Release 11, antenna port quasi-co-location is introduced in LTE, and is referred to as a concept of QCL (Quasi Co-Located) for short in the LTE system. Signals transmitted from QCL antenna ports are subject to same large-scale attenuation. The large-scale attenuation includes delay spread, Doppler spread, Doppler shift, average channel gain, and average delay. To support a terminal device (that is, a user equipment) in receiving downlink control information from a serving TRP (a TRP to which a serving cell belongs) through a PDCCH and receiving downlink data from a coordinating TRP (a TRP to which a coordinating cell belongs) through a PDSCH, the Release 11 defines a new transmission mode, to be specific, a transmission mode 10 (TM10), and mainly introduces the foregoing physical downlink shared channel resource element mapping and quasi-co-location indicator (PQI), used to indicate a TRP from which downlink data is transmitted, and a group of antenna ports with which a channel large-scale property corresponding to the downlink data is consistent. In this way, the UE can learn, based on the PQI and with reference to a PDSCH mapping message configured in radio resource control (RRC) signaling, radio channel parameters corresponding to which group of antenna ports are required for demodulating the downlink data.

Specifically, for UE for which the TM10 is configured, there are two QCL assumptions: a QCL type A and a type B. In the type A, all ports of a serving cell are quasi-co-located. In the type B, a PDSCH antenna port and an antenna port corresponding to a non-zero-power channel state information-reference signal (NZP CSI-RS) resource are quasi-co-located. An excerpt of descriptions in a protocol is as follows:

Type A: The UE may assume the antenna ports 0-3, 7-30 of a serving cell are quasi co-located with respect to delay spread, Doppler spread, Doppler shift, and average delay.

Type B: The UE may assume the antenna ports 15-30 corresponding to the CSI-RS resource configuration identified by the higher layer parameter qcl-CSI-RS-ConfigNZPId-r11 and the antenna ports 7-14 associated with the PDSCH are quasi co-located with respect to Doppler shift, Doppler spread, average delay, and delay spread.

Type A: The UE may assume that the antenna ports 0 to 3 and 7 to 30 of a serving cell have a QCL relationship with respect to delay spread, Doppler spread, Doppler shift, and average delay.

Type B: The UE may assume that the antenna ports 15 to 30 corresponding to the CSI-RS resource configuration identified by the higher layer parameter qcl-CSI-RS-ConfigNZPId-r11 and the antenna ports 7 to 14 associated with the physical downlink shared channel (PDSCH) have a QCL relationship with respect to delay spread, Doppler spread, Doppler shift, and average delay.

The antenna ports 15 to 30 are CSI-RS antenna ports, but the antenna ports 7 to 14 are PDSCH antenna ports, and DMRS antenna ports are usually consistent with the PDSCH antenna ports. Therefore, the type B also indicates a CSI-RS antenna port having a QCL relationship with a DMRS antenna port.

For example, several possible parameter sets may be delivered (or configured) by using higher layer signaling such as radio resource control (RRC) signaling. For example, in the LTE system, four possible parameter sets are delivered. By using physical layer signaling, such as DCI signaling, one parameter set that needs to be activated in the four possible parameter sets is indicated.

Specifically, in the LTE system, a field used to indicate the parameter set that needs to be activated in the four possible parameter sets is a PDSCH resource element (RE) mapping and quasi-co-location indicator (PQI) field.

One of parameters included in the parameter set delivered by using the higher layer signaling is an identifier, such as the qcl-CSI-RS-ConfigNZPId-r11 field, used to indicate a CSI-RS resource being quasi co-located with a PDSCH resource configured by the parameter set.

An identifier (identity or identifier, ID) of the CSI-RS resource indicates a group of CSI-RS resource configurations.

For example, the identifier of the CSI-RS may be csi-RS-ConfigNZPId.

Correspondingly, a configuration of each CSI-RS resource includes one or more of an antenna port quantity (such as an antennaPortsCount-r11 information element (which may also be referred to as a field)) of the CSI-RS resource, a resource configuration (such as a resourceConfig-r11 information element), a subframe configuration (such as a subframeConfig-r11 information element), a scrambling identity (such as a scramblingIdentity-r11 information element), and a CRS (common reference signal) being quasi co-located, that is, having a QCL relationship, with the CSI-RS resource (such as a qcl-CRS-Info-r11 information element).

For example, information elements included in a group of CSI-RS resource configurations may be as follows (3GPP TS36.211):

parameter set, and can further learn a CRS port that should be referenced for performing demodulation, frequency offset correction, and the like when a PDSCH corresponding to the parameter set is received.

Specifically, delay spread, Doppler spread, Doppler shift, and average delay are all large-scale parameters. That an antenna port such as an antenna port A and another antenna port such as an antenna port B are quasi-co-located with respect to large-scale parameters means that a channel large-scale parameter of the antenna port B may be inferred by using a channel large-scale parameter obtained (con-

```
CSI-RS-ConfigNZP information elements
    -- ASN1START
    CSI-RS-ConfigNZP-r11 ::=    SEQUENCE {
        csi-RS-ConfigNZPId-r11          CSI-RS-ConfigNZPId-r11,
        antennaPortsCount-r11           ENUMERATED {an1, an2, an4, an8},
        resourceConfig-r11              INTEGER (0..31),
        subframeConfig-r11              INTEGER (0..154),
        scramblingIdentity-r11          INTEGER (0..503),
        qcl-CRS-Info-r11                SEQUENCE {
            qcl-ScramblingIdentity-r11      INTEGER (0..503),
            crs-PortsCount-r11              ENUMERATED {n1, n2, n4, spare1},
            mbsfn-SubframeConfigList-r11    CHOICE {
                release                         NULL,
                setup                           SEQUENCE {
                    subframeConfigList              MBSFN-SubframeConfigList
                }
            }
        }   OPTIONAL -- Need ON
    }   OPTIONAL,-- Need OR
    ...,
    [[  csi-RS-ConfigNZPId-v1310       CSI-RS-ConfigNZPId-v1310    OPTIONAL -- Need ON
    ]]
    }
    CSI-RS-ConfigNZP-EMIMO-r13 ::=    CHOICE {
        release                 NULL,
        setup                   SEQUENCE {
            nzp-resourceConfigList-r13   SEQUENCE  (SIZE  (1..2))  OF  NZP-ResourceConfig-r13,
            cdmType-r13                  ENUMERATED  {cdm2,  cdm4}  OPTIONAL -- Need OR
        }
    }
    NZP-ResourceConfig-r13 ::=   SEQUENCE {
        resourceConfig-r13            ResourceConfig-r13,
        ...
    }
    ResourceConfig-r13 ::=        INTEGER (0..31)
    -- ASN1STOP
```

The foregoing PQI field may be delivered in a DCI (downlink control information) format 2D. For example, the PQI field may occupy two bits.

For example, meanings of the two bits of the PQI may be shown in the following table:

| Value of 'PDSCH RE mapping and quasi-co-location indicator' field | Description |
|---|---|
| '00' | Parameter set 1 configured by higher layers |
| '01' | Parameter set 2 configured by higher layers |
| '10' | Parameter set 3 configured by higher layers |
| '11' | Parameter set 4 configured by higher layers |

In this way, the UE can learn, based on the received quasi-co-location indicator field, which parameter set is used, can learn a relationship between a CSI-RS port and a CRS port based on configurations about the CSI-RS in the veyed) from the antenna port A. The large-scale parameter may further include average gain. Further, the large-scale parameter may further include spatial information (also referred to as a spatial parameter,). The spatial information may include at least one of a receive angle of arrival, an angle of departure (also referred to as a transmit angle), an angle of arrival spread, an angle of departure spread, and spatial correlation. The spatial correlation may be related to a signal correlation matrix. Elements in the signal correlation matrix are used to describe correlation between two antenna units, where the antenna units may be antenna elements or antenna panels, or may be other antenna units. This is not limited herein.

With emergence of multiple antenna panels of a TRP, QCL may be further applied to a case of multi-panel transmission.

In this application, the QCL assumptions may further include QCL between the second signal and the first signal with respect to the spatial information.

For example, assuming that a QCL relationship between a CSI-RS and an uplink SRS is defined, and that spatial information is an angle of departure and an angle of arrival, descriptions of the type B in the QCL assumptions may further include:

The UE may assume the antenna ports 15-30 corresponding to the CSI-RS resource configuration identified by the higher layer parameter qcl-Csirs-UplinkSRS and the antenna ports 40-43 are quasi co-located with respect to Angle of arrival/Angle of departure.

To be specific, the UE may assume that the antenna ports 15 to 30 corresponding to the CSI-RS resource indicated by the higher layer parameter qcl-Csirs-UplinkSRS and antenna ports 40 to 43 have a QCL relationship with respect to the angle of arrival and the angle of departure.

The antenna ports 40 to 43 may be uplink SRS ports.

Specifically, the second wireless network device may deliver, by using higher layer signaling, such as RRC signaling, a plurality of parameter sets used for data transmission. For example, each parameter set may include content such as the content in the foregoing parameter set (or may not include some of the content in the foregoing parameter set; this is not limited herein), and further include resource information used to indicate the first signal being quasi co-located, that is, having a QCL relationship, with the second signal, such as a resource identifier. For example, if the second signal is an uplink SRS, and the first signal is a CSI-RS, each parameter set may include a resource identifier of a CSI-RS. Because each parameter set further includes a resource identifier of a CSI-RS being quasi co-located with a PDSCH, a quantity of parameter sets may be determined based on a combination of the resource identifier of the CSI-RS being quasi co-located with the PDSCH and the resource identifier of the CSI-RS being quasi co-located with the uplink SRS (that is, joint coding), and further, index information of parameter sets having different combinations is obtained. For example, there may be four resource identifiers of the CSI-RS being quasi co-located with the PDSCH, and there may also be four resource identifiers of the CSI-RS being quasi co-located with the uplink SRS. In this case, there are 16 parameter sets having different combinations.

Further, the second wireless network device may transmit a field used to indicate quasi-co-location information to the UE, such as the PQI, to transmit the foregoing first indication information to the UE.

Optionally, the field used to indicate the quasi-co-location information may be delivered by using DCI.

Optionally, the field used to indicate the quasi-co-location information may also be delivered by using higher layer signaling.

For example, there are 16 parameter sets having the foregoing different combinations. In this case, a 4-bit field may be used to indicate a parameter set used by the UE, that is, the first indication information is the 4-bit field, and the field may indicate the quasi-co-location information. The UE further learns, based on the 4-bit field from the second wireless network device, resource identifier information that is of the CSI-RS being quasi co-located with the uplink SRS and is included in the parameter set. In addition, because the parameter set further includes resource identifier information of the CSI-RS being quasi co-located with the PDSCH, the UE may further learn information of the PDSCH being quasi co-located with the uplink SRS, such as information of a DMRS antenna port. Numbers 16 and 4 in the 16 parameter sets and the 4-bit field are examples, or may be other values, and are not limited herein.

The plurality of parameter sets used for data transmission may be included in a field of higher layer signaling, and a parameter set may include at least one of the following parameters:

a quantity of ports of a cell reference signal, a port number of a cell reference signal, an indication of a frequency domain location of a cell reference signal, and an indication of a time domain location of a cell reference signal;

a resource indication of a synchronization signal (the resource includes at least one of a time domain resource, a frequency domain resource, or a beam resource, and optionally, the indication may be an index or an identifier), and an indication of a time domain unit of a synchronization signal (where the time domain unit may be one or more of a subframe, a timeslot, an orthogonal frequency-division multiplexing (OFDM) symbol, or a mini-timeslot, for example, the indication may be an index or an identifier);

multimedia broadcast multicast service single frequency network (MBSFN) configuration information (for example, the configuration information may be a time domain unit format of MBSFN transmission, the configuration information is used to indicate a time domain unit occupied for MBSFN transmission, and the time domain unit may be one or more of a subframe, a timeslot, a symbol, or a mini-timeslot);

a resource indication of a zero-power CSI-RS used for obtaining a channel state;

a resource location indication of a downlink data channel (such as a physical downlink shared channel (PDSCH)) (for example, the resource location may be a time domain or frequency domain resource location of the PDSCH, where the time domain location may be a time domain resource occupied by the PDSCH, such as a start and/or end OFDM symbol of the PDSCH, and the frequency domain location may be a frequency domain resource occupied by the PDSCH);

a resource indication, used to indicate a QCL relationship with a downlink DMRS, of a non-zero-power CSI-RS used for obtaining a channel state (the resource indication may be used to indicate a time-frequency location and/or sequence of a CSI-RS pilot, for example, the resource indication may be a resource identifier of the CSI-RS), and a large-scale parameter indication used to indicate a QCL relationship with a downlink DMRS (the indication is a large-scale parameter used to indicate a QCL relationship with the CSI-RS, for example, the indication may be a large-scale parameter type indication used to indicate a QCL relationship between the CSI-RS and the DMRS, or may be a large-scale parameter indication used to indicate a QCL relationship between the CSI-RS and the DMRS); and a resource identifier indication, used to indicate a QCL relationship with an uplink SRS, of a non-zero-power CSI-RS used for obtaining a channel state, a port indication, used to indicate a QCL relationship with an uplink SRS, of a non-zero-power CSI-RS used for obtaining a channel state, a time-frequency location indication, used to indicate a QCL relationship with an uplink SRS, of a non-zero-power CSI-RS used for obtaining a channel state, a resource indication of a downlink DMRS, used to indicate a QCL relationship with an uplink SRS, a port (group) indication of a downlink DMRS, used to indicate a QCL relationship with an uplink SRS, a time-frequency location indication of a downlink DMRS, used to indicate a QCL relationship with an uplink SRS, a resource indication of a synchronization signal, used to indicate a QCL relationship with an uplink SRS (such as an indication of a time domain unit of the synchronization signal, or a resource number of the synchronization signal), and a large-scale parameter indication used to indicate a QCL relationship with an uplink SRS.

In this application, for a definition of QCL, refer to a definition of QCL in 5G. In the new radio NR system, QCL is defined as follows: Signals transmitted by antenna ports that are quasi-co-located are subject to same large-scale attenuation. The large-scale attenuation includes one or more of the following parameters: delay spread, Doppler spread, Doppler shift, average channel gain, average delay, and a spatial domain parameter. The spatial domain parameter may be one or more of parameters such as a transmit angle (AoD), a dominant transmit angle (Dominant AoD), an average angle of arrival (Average AoA), an angle of arrival (AoA), a channel correlation matrix, a power azimuth spectrum of an angle of arrival, an average angle of departure (Average AoD), a power azimuth spectrum of an angle of departure, transmit channel correlation, receive channel correlation, transmit beamforming, receive beamforming, spatial channel correlation, a filter, a spatial filter parameter, or a spatial receive parameter.

In this application, the indication may be an identifier or an index, and is not limited herein.

In this application, the time domain unit may be one or more of a subframe, a timeslot, an OFDM symbol, or a mini-timeslot.

In this way, by using the first indication information, the UE can determine an activated parameter set in the plurality of parameter sets, and further obtain corresponding parameters, for example, learn a QCL relationship between a CSI-RS and a DMRS for receiving a PDSCH and a QCL relationship between a transmitted SRS and the first signal.

In another optional manner, the first indication information is included in downlink control information, and the downlink control information further includes information used to indicate uplink scheduling related information, where the uplink scheduling related information includes at least one of an uplink time-frequency mapping location and a modulation and coding scheme.

In this manner, the first indication information is not included in a field used to indicate QCL information, for example, a PQI, but the first indication information is carried in other bits (field), for example, carried in an uplink QCL indicator field (Uplink Quasi-Co-Location Indicator), where the field includes several bits. Binary values of the several bits or each of the several bits (in a form of a bitmap) may indicate information of the first signal being quasi co-located with the second signal. A quantity of the several bits is related to a quantity of pieces of information of the first signal being quasi co-located with the second signal. For example, if the first signal is a CSI-RS, and a quantity of resource identifiers of the first signal is 4, the quantity of the several bits may be 2, where "00", "01", "10", and "11" respectively indicate one of the four CSI-RS resource identifiers; or the quantity of the several bits may be 4, and each bit corresponds to one of the four CSI-RS resource identifiers. Optionally, when one bit is 1, it may indicate that a corresponding CSI-RS resource identifier is activated; or when one bit is 0, it may indicate that a corresponding CSI-RS resource identifier is not activated.

Optionally, the uplink QCL indicator field may be a field dedicated to indicating a QCL relationship between the second signal and the first signal, or the uplink QCL indicator field may be included in an SRS request field (such as a field in an SRS request field). The SRS request field is an SRS request in downlink control information transmitted by a base station to the UE, and the SRS request field is used to trigger the UE to transmit an SRS, or is used to instruct the UE to transmit a closed-loop power control parameter of an uplink signal.

Optionally, the first indication information, for example, the uplink QCL indicator field, may be carried in DCI, and is a field dedicated to indicating a QCL relationship between the second signal and the first signal, or the first indication information may be jointly indicated with other indication information. For example, the first indication information may be jointly indicated with indication information of an SRS request. Specifically, the SRS request field is an SRS request in downlink control information transmitted by the base station to the UE, and the SRS request field is used to trigger the UE to transmit an SRS. Optionally, the SRS request field may be further used to instruct the UE to transmit a closed-loop power control parameter of an uplink signal. Specifically, a first wireless network device may transmit downlink control information to the UE, where the downlink control information may carry an SRS request field used to instruct the UE to transmit information of an SRS. The SRS request field may be further used as first indication information. For example, some fields in the SRS request field may indicate the first indication information, or an indicator bit of the SRS request field may indicate the first indication information.

Optionally, the first indication information may be included in a field used to indicate uplink scheduling related information.

S102. A first wireless network device transmits the first signal to the user equipment, and correspondingly, the user equipment receives the first signal from the first wireless network device, where the first wireless network device and the second wireless network device may be the same, that is, may be the same wireless network device, or may be different.

Optionally, the first wireless network device may be a wireless network device to which a serving cell of the user equipment belongs, or may be a wireless network device to which a coordinating cell of the user equipment belongs; and the second wireless network device may be the wireless network device to which the serving cell of the user equipment belongs.

S103. The user equipment determines spatial information of the second signal based on the first signal, and transmits the second signal to the first wireless network device by using the spatial information of the second signal.

Optionally, the spatial information of the second signal includes a transmit angle of the second signal, and the transmit angle of the second signal is determined based on an angle of arrival of the first signal.

Further, the first wireless network device may further determine a receive angle of arrival of the second signal based on the first signal, and receive the second signal by using the receive angle of arrival.

Further, an operation manner of determining the spatial information may be as follows: The UE adjusts a weight of a physical and/or logical antenna, for example, adjusts a weight by adjusting a phase of an analog phase shifter and/or adjusting a precoding matrix of a digital precoding, and the like, to form a weight array. The UE may adjust a weight when receiving a signal, so that a receive weight matrix is formed. A purpose of forming a receive matrix by the UE is to optimize signal receive performance and reduce interference, and the like. The UE may obtain, based on energy distribution of the first signal in spatial domain, spatial information for receiving the first signal, and therefore select a receive matrix that the UE considers as most appropriate to receive the signal. For example, the obtaining, based on energy distribution of the first signal in spatial domain, spatial information for receiving the first signal may include obtaining a signal correlation matrix from a spatial power spectrum of the signal through mathematical transform (such as Fourier transform). Weights adjusted during signal transmission form a transmit weight matrix.

Further, when the first signal includes a plurality of signals, the UE determines the spatial information of the second signal based on spatial information of the plurality of signals in the first signal. Specifically, the UE may process the plurality of signals in the first signal, and obtain the spatial information of the second signal. For example, the UE uses spatial domain or angle domain or beam domain information corresponding to spatial information of each signal in the first signal, as spatial domain or angle domain or beam domain information of the second signal; or the UE uses spatial domain or angle domain or beam domain information corresponding to spatial information of some signals in the first signal, as spatial domain or angle domain or beam domain information of the second signal. Further, the UE may use spatial information of some signals in the first signal as spatial information of a wanted signal. The UE may use spatial information of some signals in the first signal as spatial information of interference. When obtaining the spatial information of the second signal, the UE may use spatial domain or angle domain or beam domain information corresponding to some signals in the first signal, as spatial information of a wanted signal, and use spatial domain or angle domain or beam domain information corresponding to some signals in the first signal, as spatial information of interference. The wanted signal may also be referred to as a channel.

Further, when the second signal includes a plurality of signals, the UE may use same or approximate spatial information for the plurality of signals of the second signal.

For example, that the first signal includes a plurality of signals may mean that the first signal includes a plurality of CSI-RS resources or CSI-RS ports; and that the second signal includes a plurality of signals may mean that the second signal includes a plurality of SRS resources or SRS ports.

Optionally, the UE may use a receive direction of the first signal as a reference for a transmit direction of the second signal.

For example, the UE may adjust a transmit antenna weight to form a conjugate matrix relationship between a transmit weight matrix of the second signal and a receive weight matrix of the first signal. Optionally, the conjugate matrix relationship between the transmit weight matrix of the second signal and the receive weight matrix of the first signal includes: the transmit weight matrix of the second signal is a Hermite matrix of the receive weight matrix of the first signal.

For S102 and S103, for example, in the foregoing DPS scenario shown in FIG. 4, both the first wireless network device (TRP 1) and the second wireless network device (TRP2) deliver data to the UE, where a CSI-RS resource ID delivered by the TRP 1 is the same as a CSI-RS resource ID that is indicated by the first indication information received by the UE and is quasi-co-located with the second signal (such as an SRS). Therefore, the UE determines the spatial information of the second signal based on the CSI-RS resource ID delivered by the TRP 1. For example, a direction of a transmit beam of the second signal points to the TRP 1. A CSI-RS resource ID delivered by the TRP 2 is different from the CSI-RS resource ID that is indicated by the first indication information received by the UE and is quasi-co-located with the second signal (such as an SRS). Therefore, the UE does not transmit the second signal to the TRP 2. It may be understood that, in some scenarios, if there are a plurality of pieces of spatial information of the second signal to be transmitted by the UE, for example, in a JT scenario, the UE may transmit a data signal and/or a control signal to a plurality of TRPs, correspondingly, there may also be a plurality of pieces of spatial information of the first signal. For example, more than one TRP uses a same antenna port or resource identifier of the first signal being quasi co-located with the second signal with respect to spatial information. Therefore, an objective of determining a plurality of spatial information of the to-be-transmitted second signal is achieved.

In addition, it may be understood that, usually an antenna port of a reference signal used for uplink channel sounding, such as an SRS, is consistent with an antenna port of an uplink data channel (such as a physical uplink shared channel (physical uplink shared channel, PUSCH)) and/or an uplink control channel (such as a physical uplink control channel (PUCCH)).

The UE may further determine, based on the spatial information of the second signal, spatial information of a signal associated with the second signal, for example, spatial information of at least one of an uplink control channel, an uplink data signal, and a reference signal used for uplink demodulation.

In this way, the UE can determine the spatial information of the second signal by using the first signal received by the UE and the first indication information used to indicate QCL between the second signal and the first signal with respect to spatial information.

Optionally, in another possible embodiment, the foregoing S101 is optional.

Specifically, S101 may be omitted when the first signal being quasi co-located with the second signal in the QCL relationship between the first signal and the second signal with respect to spatial information is a compliant and fixed, unconfigurable, or dynamically changing signal between the TRP and the UE. The QCL relationship may be predefined by the protocol.

Therefore, in compliance with the foregoing predefined QCL relationship, the TRP indicates the spatial information of the to-be-transmitted second signal of the UE to the UE by delivering the first signal. When receiving the first signal, the UE learns of the spatial information of the to-be-transmitted second signal of the UE in compliance with the foregoing predefined QCL relationship. Therefore, an objective of determining the spatial information of the to-be-transmitted second signal by the UE is achieved.

The implementation shown in FIG. 5c includes the following steps.

S201. A user equipment receives second indication information from a second wireless network device, where the second indication information is used to indicate that a first signal serves as a reference for spatial information of a second signal, and correspondingly, the second wireless network device transmits the second indication information to the user equipment.

S202. The user equipment receives the first signal from a first wireless network device, and correspondingly, the first wireless network device transmits the first signal to the user equipment.

S203. The user equipment determines the spatial information of the to-be-transmitted second signal based on the first signal, and transmits the to-be-transmitted second signal by using the spatial information of the second signal.

Optionally, the spatial information of the second signal includes a transmit angle of the second signal, and the transmit angle of the second signal may be determined based on an angle of arrival of the first signal.

Further, an operation manner of determining the spatial information may be as follows: The UE adjusts a weight of a physical and/or logical antenna, for example, adjusts a weight by adjusting a phase of an analog phase shifter and/or adjusting a precoding matrix of a digital precoding, and the like, to form a weight array. The UE may adjust a weight when receiving a signal, so that a receive weight matrix is formed. A purpose of forming a receive matrix by the UE is to optimize signal receive performance and reduce interference, and the like. The UE may obtain, based on energy distribution of the first signal in spatial domain, spatial information for receiving the first signal, and therefore select a receive matrix that the UE considers as most appropriate to receive the signal. For example, the obtaining, based on energy distribution of the first signal in spatial domain, spatial information for receiving the first signal may include obtaining a signal correlation matrix from a spatial power spectrum of the signal through mathematical transform (such as Fourier transform). Weights adjusted during signal transmission form a transmit weight matrix.

Further, when the first signal includes a plurality of signals, the UE determines the spatial information of the second signal based on spatial information of the plurality of signals in the first signal. Specifically, the UE may process the plurality of signals in the first signal, and obtain the spatial information of the second signal. For example, the UE uses spatial domain or angle domain or beam domain information corresponding to spatial information of each signal in the first signal, as spatial domain or angle domain or beam domain information of the second signal; or the UE uses spatial domain or angle domain or beam domain information corresponding to spatial information of some signals in the first signal, as spatial domain or angle domain or beam domain information of the second signal. Further, the UE may use spatial information of some signals in the first signal as spatial information of a wanted signal. The UE may use spatial information of some signals in the first signal as spatial information of interference. When obtaining the spatial information of the second signal, the UE may use spatial domain or angle domain or beam domain information corresponding to some signals in the first signal, as spatial information of a wanted signal, and use spatial domain or angle domain or beam domain information corresponding to some signals in the first signal, as spatial information of interference. The wanted signal may also be referred to as a channel.

Further, when the second signal includes a plurality of signals, the UE may use same or approximate spatial information for the plurality of signals of the second signal.

For example, that the first signal includes a plurality of signals may mean that the first signal includes a plurality of CSI-RS resources or CSI-RS ports; and that the second signal includes a plurality of signals may mean that the first signal includes a plurality of SRS resources or SRS ports. Optionally, the UE may use a receive direction of the first signal as a reference for a transmit direction of the second signal.

For example, the UE may adjust a transmit antenna weight to form a conjugate matrix relationship between a transmit weight matrix of the second signal and a receive weight matrix of the first signal. Optionally, the conjugate matrix relationship between the transmit weight matrix of the second signal and the receive weight matrix of the first signal includes: the transmit weight matrix of the second signal is a Hermite matrix of the receive weight matrix of the first signal.

The second wireless network device and the first wireless network device may be the same or different.

A difference between the implementation shown in FIG. 5c and the implementation shown in FIG. 5b lies in that the first indication information in FIG. 5b is related to the QCL assumptions, but the second indication information in FIG. 5c has no direct relationship with the QCL assumptions. In FIG. 5c, the second indication information is used to indicate that the first signal serves as the reference for the spatial information of the second signal. To be specific, signaling is added to downlink transmission to indicate a reference resource for uplink transmission of the UE. The signaling (second indication information) may be physical layer signaling or higher layer signaling, or may be a combination of higher layer signaling and physical layer signaling (for example, the higher layer signaling notifies a configuration, and physical layer signaling notifies activation).

Specifically, the first signal may include a non-zero-power reference signal, for example, at least one of a reference signal (such as a CSI-RS) used for obtaining channel state information, a reference signal (such as a DMRS) used for demodulation, and a reference signal (such as a BMRS) used for beam management. The second signal is an uplink signal, and may be an uplink reference signal, for example, at least one of a reference signal used for demodulation or a reference signal used for uplink channel sounding, or may be an uplink data signal or a control signal.

Optionally, the second indication information may be included in configuration information of the first signal.

Optionally, the configuration information of the first signal includes at least one of a channel state information measurement setting field of the first signal, a process field of the first signal, a resource field of the first signal, an antenna port information field of the first signal, and a beam information field of the first signal. The beam information field of the first signal may include a beam identifier (ID) of the first signal, and optionally, may further include a reference signal (RS) resource for beam management, such as an RS ID and/or an RS antenna port.

Optionally, the second indication information includes several bits, the first signal corresponds to at least one of the several bits, and the at least one bit indicates that the first signal serves as the reference for the spatial information of the second signal. In this case, the second indication information may be included in the channel state information measurement setting field of the first signal or the process field of the first signal.

Assuming that the first signal is a CSI-RS, and that the second indication information is included in the CSI measurement setting field (higher layer signaling), as shown below, the second indication information may be expressed as a reference NZP CSI-RS ID field (referenceCsirsNZPId), and the field is defined as a bit string (bit stream). Each bit in the bit stream may indicate, in a sequence predefined by a protocol, whether an NZP CSI-RS corresponding to the NZP CSI-RS ID serves as a reference for the spatial information of the second signal. It may be understood that, in another optional manner, the field includes several NZP CSI-RS ID values, where each ID value indicates a resource serving as a reference for the spatial information of the second signal. Because a TRP knows a beam to which the first signal that needs to be indicated as a reference for the second signal belongs, a relationship between the first signal and the beam may be controlled, and the spatial information of the second signal is controllable.

```
CSI MeasurementSetting ::=    SEQUENCE {
  ...
  csi-RS-ConfigNZPId1         CSI-RS-ConfigNZPId1,
  ...
  csi-RS-ConfigNZPIdX         CSI-RS-ConfigNZPIdX,
  referenceCsirsNZPId         BIT STRING
  ...
}
-- ASN1STOP
```

Optionally, the second indication information is a field with a Boolean value, or the second indication information exists only when being used to indicate that the first signal serves as the reference for the spatial information of the second signal. In this case, the second indication information is included in at least one of the resource field of the first signal, the antenna port information field of the first signal, and the beam information field of the first signal.

Assuming that the first signal is a CSI-RS, and that the second indication information is included in a resource field (higher layer signaling) of the NZP CSI-RS, as shown below, the second indication information may be expressed as an uplink reference enable field (referenceUplinkEnable). The uplink reference enable field is defined as a Boolean value. For example, a value 1 may indicate that an NZP CSI-RS resource in which the field is located serves as a reference for the spatial information of the second signal; and a value 0 may indicate that the NZP CSI-RS resource in which the field is located does not serve as a reference for the spatial information of the second signal. Alternatively, the uplink reference enable field may be defined as a field that is configured (exists) only when required. When the field exists in a message format, it indicates that the NZP CSI-RS resource in which the field is located serves as a reference for the spatial information of the second signal. When the field does not exist in a message format, it indicates that the NZP CSI-RS resource in which the field is located does not serve as a reference for the spatial information of the second signal. In this case, even if the UE previously used the NZP CSI-RS resource in which the field is located as a reference for the spatial information of the second signal, the UE needs to stop continuing using the NZP CSI-RS resource in which the field is located as a reference for the spatial information of the second signal. Optionally, the NZP CSI-RS resource field may further include a field that is configured only when required. When the field exists in a message format, it indicates that the NZP CSI-RS resource in which the field is located does not serve as a reference for the spatial information of the second signal. In this case, when the field indicating that the NZP CSI-RS resource in which the field is located serves as a reference for the spatial information of the second signal does not exist in a message format, it indicates that the NZP CSI-RS resource in which the field is located continues serving as a reference for the spatial information of the second signal, until the field indicating that the NZP CSI-RS resource in which the field is located does not serve as a reference for the spatial information of the second signal exists in a message format.

```
CSI-RS-ConfigNZP ::=    SEQUENCE {
  ...
  referenceUplinkEnable Boolean
  ...
}
or
CSI-RS-ConfigNZP ::=    SEQUENCE {
  ...
  referenceUplinkEnable ENUMERATED {true}   OPTIONAL --Need OR
  ...
}
```

The second indication information may also be included in physical layer signaling, for example, downlink control information (DCI). When the DCI includes at least one of the channel state information measurement setting (CSI measurement setting) field, the process field of the first signal, the resource field of the first signal, the antenna port information field of the first signal, and the beam information field of the first signal, the second indication information may also be included in at least one of the foregoing fields in the DCI. Alternatively, the second indication information may be included in an independent field, that is, not included in any one of the foregoing fields.

For example, the first signal is beam number information (for example, included in the beam information field or an independent field), and the second indication information is included in the DCI. In this case, a quantity of bits occupied by the second indication information in the DCI is related to a quantity of beams. For example, if the beam number information is 0 to 3, 2-bit information in the DCI may be used to indicate, to the UE, a receive direction of which beam is a reference for the spatial information of the uplink signal to be transmitted by the UE. For another example, the first signal is a CSI-RS, the reference for the spatial information of the second signal is an antenna port of the first signal or a resource ID (for example, included in the resource field of the first signal or an independent field) of an antenna port, and the second indication information is included in the DCI. In this case, a quantity of bits occupied by the second indication information in the DCI is related to grouping of the antenna port or grouping of the resource ID of the antenna port. For example, for antenna ports 0 to 3, ports 0 and 1 are one group, and ports 2 and 3 are another group. In this case, one bit in the DCI may be used as the second indication information; and when the second indication information is 1, it indicates that signals on the antenna ports 0 and 1 serve as a reference for the spatial information of the second signal; or when the second indication information is 0, it indicates that signals on the antenna ports 2 and 3 serve as a reference for the spatial information of the second signal. It may be understood that, a specific indication manner of the second indication information may be defined differently according to an actual situation. Herein the examples are not used as limitations.

Optionally, the second indication information may also be carried in a field similar to the field of the first indication information. Specifically, the second indication information may be carried in an SRS request field in the downlink control information.

Therefore, based on an explicit indication of the second indication information, the UE learns of the first signal serving as a reference for the spatial information of the second signal, and can further determine the spatial information of the to-be-transmitted second signal.

An embodiment of the present application further provides an implicit indication. The implementation shown in FIG. 5d includes the following steps.

S301. A user equipment receives a first signal from a first wireless network device, and correspondingly, the first wireless network device transmits the first signal to the user equipment.

Specifically, the first signal is a reference signal for spatial information of a second signal.

Optionally, the first signal has a feature of the reference signal for the spatial information of the second signal.

S302. The user equipment determines spatial information of a to-be-transmitted second signal based on the first signal, and transmits the to-be-transmitted second signal by using the spatial information.

Specifically, the user equipment determines that the first signal is the reference signal for the spatial information of the second signal, and the user equipment determines the spatial information of the to-be-transmitted second signal based on the first signal.

Further, an operation manner of determining the spatial information may be as follows: The UE adjusts a weight of a physical and/or logical antenna, for example, adjusts a weight by adjusting a phase of an analog phase shifter and/or adjusting a precoding matrix of a digital precoding, and the like, to form a weight array. The UE may adjust a weight when receiving a signal, so that a receive weight matrix is formed. A purpose of forming a receive matrix by the UE is to optimize signal receive performance and reduce interference, and the like. The UE may obtain, based on energy distribution of the first signal in spatial domain, spatial information for receiving the first signal, and therefore select a receive matrix that the UE considers as most appropriate to receive the signal. For example, the obtaining, based on energy distribution of the first signal in spatial domain, spatial information for receiving the first signal may include obtaining a signal correlation matrix from a spatial power spectrum of the signal through mathematical transform (such as Fourier transform). Weights adjusted during signal transmission form a transmit weight matrix.

Further, when the first signal includes a plurality of signals, the UE determines the spatial information of the second signal based on spatial information of the plurality of signals in the first signal. Specifically, the UE may process the plurality of signals in the first signal, and obtain the spatial information of the second signal. For example, the UE uses spatial domain or angle domain or beam domain information corresponding to spatial information of each signal in the first signal, as spatial domain or angle domain or beam domain information of the second signal; or the UE uses spatial domain or angle domain or beam domain information corresponding to spatial information of some signals in the first signal, as spatial domain or angle domain or beam domain information of the second signal. Further, the UE may use spatial information of some signals in the first signal as spatial information of a wanted signal. The UE may use spatial information of some signals in the first signal as spatial information of interference. When obtaining the spatial information of the second signal, the UE may use spatial domain or angle domain or beam domain information corresponding to some signals in the first signal, as spatial information of a wanted signal, and use spatial domain or angle domain or beam domain information corresponding to some signals in the first signal, as spatial information of interference. The wanted signal may also be referred to as a channel.

Further, when the second signal includes a plurality of signals, the UE may use same or approximate spatial information for the plurality of signals of the second signal.

For example, that the first signal includes a plurality of signals may mean that the first signal includes a plurality of CSI-RS resources or CSI-RS ports; and that the second signal includes a plurality of signals may mean that the first signal includes a plurality of SRS resources or SRS ports.

Optionally, the UE may use a receive direction of the first signal as a reference for a transmit direction of the second signal.

For example, the UE may adjust a transmit antenna weight to form a conjugate matrix relationship between a transmit weight matrix of the second signal and a receive weight matrix of the first signal. Optionally, the conjugate matrix relationship between the transmit weight matrix of the second signal and the receive weight matrix of the first signal includes: the transmit weight matrix of the second signal is a Hermite matrix of the receive weight matrix of the first signal.

Optionally, that the user equipment determines that the first signal is the reference signal for the spatial information of the second signal includes: the user equipment determines that the first signal has the feature of the reference signal for the spatial information of the second signal.

Optionally, the feature of the reference signal for the spatial information of the second signal includes resource information of the signal, the resource information includes at least one of antenna port information, resource identifier information, channel state information measurement setting identifier information, and process identifier information, and the signal includes at least one of a downlink control signal, a non-zero-power reference signal, and a signal used for beam management.

Optionally, the spatial information of the second signal includes a transmit angle of the second signal, and the transmit angle of the second signal may be determined based on an angle of arrival of the first signal.

In this case, the reference (including a reference set) used to indicate the spatial information of the second signal is predefined by a protocol, and is known by both a TRP and the user equipment.

Optionally, the reference (including a reference set) used to indicate the spatial information of the second signal cannot be configured.

In a possible manner, as specified in the protocol, the UE uses a resource of a channel (which may be referred to as a downlink control channel, such as a physical downlink control channel (PDCCH)) used for transmitting downlink control information, as a reference for transmitting an uplink signal. To be specific, the first signal is a downlink control channel. A resource of the downlink control channel includes at least one of an antenna port of a reference signal on the downlink control channel, an analog beam in which the downlink control channel is located, and the like.

Usually the downlink control channel is transmitted by a serving cell, and the UE needs to perform an uplink feedback to the serving cell. Therefore, a receive beam for using the downlink control channel may be defined as a reference for the spatial information of the uplink signal (second signal).

Using DPS in FIG. 4 as an example, in a coordinated transmission scenario, a serving cell and a coordinating cell exist. As specified in the protocol, a UE should determine an uplink transmit direction by using a receive direction of a downlink control channel.

In some scenarios, such as a DPS scenario, a gNB and a TRP may coexist, and the TRP may be a radio unit (RU).

When a base station performs scheduling, if the UE is required to transmit an uplink signal to the serving cell, the base station transmits a downlink control channel only in the serving cell; or if the UE is required to transmit uplink signals to the serving cell and another coordinating cell, all base stations that need to receive the uplink signals of the UE should transmit downlink control channels. A mode of transmitting downlink control channels by a plurality of cells may be a simultaneous SFN (single frequency network) transmission mode, or a time division transmission mode, or the like.

In still another possible manner, for example, as specified in the protocol, the UE should use a (some) downlink antenna port as a reference for uplink transmission. For example, using a CSI-RS port as a reference, the protocol specifies a port number to be referenced by the UE.

In this manner, the UE may determine an angle of departure of uplink transmission by using an angle of arrival of a receive antenna port. In this manner, the TRP may cooperate in resource scheduling. To be specific, only the TRP that needs to receive the uplink signal of the UE can configure the antenna port serving as a reference for the angle of departure of uplink transmission.

For example, as specified in the protocol, the UE uses a downlink antenna port 0 as a reference for the angle of departure of uplink transmission.

When the base station performs a configuration, if a plurality of base stations cooperate, only a base station that needs to receive an uplink signal of the UE configures the antenna port 0; otherwise, the configuration of the antenna port 0 should be avoided.

For example, for a TRP 1 and a TRP 2, if the base station requires the UE to transmit an uplink signal to the TRP 1, the TRP 1 configures, during beam alignment, at least the antenna port 0 to form a downlink beam. After sweeping is completed in a downlink transmit direction and receive direction, both the TRP 1 and the UE store information of a beam pair including the antenna port 0.

The TRP 1 transmits the first signal by using the antenna port 0, but the TRP 2 transmits the first signal without using the antenna port 0.

In this way, only the TRP 1 transmits the first signal by using the antenna port 0, and the protocol specifies that the UE uses the antenna port 0 as a reference. Therefore, the UE is allowed to use a downlink arrival direction of a beam pair established with only the TRP 1 and including the antenna port 0, to determine an uplink transmit direction.

Optionally, the TRP 2 may not allocate an antenna port 0 in a beam formed during beam alignment. For example, the TRP 2 configures the antenna port 1 to form downlink beam sweeping.

In this way, the antenna port 0 exists only in the downlink beam pair established between the TRP 1 and the UE, but the protocol specifies that the UE uses the antenna port 0 as a reference. Therefore, the UE may be allowed to use the downlink arrival direction of the beam pair established with only the TRP 1 and including the antenna port 0, to determine the uplink transmit direction.

In still another possible manner, the method is applied to beam management, and a beam ID exists. A beam ID corresponds to a group of downlink transmit beam resources of the TRP and receive beam resources of the UE. The protocol specifies that a beam ID resource agreed by the protocol should be referenced for uplink transmission of the UE. For example, based on a downlink beam whose beam ID is X, a resource is referenced for uplink transmission.

An advantage of the manner is as follows: The base station can configure different beam pairs on different time resources. For a beam ID stored by the UE, the UE can perform uplink transmission at a random access stage by using the aligned beam ID X, and can fully use a sweeping result.

Optionally, the base station may further configure, in a process of performing downlink beam alignment, only a TRP used for receiving the second signal of the UE, to perform downlink beam alignment at a beam sweeping stage by using the resource whose beam ID is X. Therefore, the UE may be allowed to use a downlink arrival direction of a beam pair established with the TRP used for receiving the second signal of the UE, to determine the uplink transmit direction.

For example, as specified in the protocol, the UE uses the beam ID 0 as a reference for uplink transmission.

When the base station performs a configuration, if a plurality of base stations cooperate, only a base station that needs to receive an uplink signal of the UE configures the beam ID as 0; otherwise, configuring the beam ID as 0 should be avoided.

This manner is applicable to a case in which a beam ID parameter exists. The beam ID may be delivered by using higher layer signaling or physical layer signaling.

For example, for the TRP 1 and the TRP 2, the base station requires the UE to transmit an uplink signal to the TRP 1 but not to transmit an uplink signal to the TRP 2.

In this case, the TRP 1 configures the beam ID as 0 at a beam training stage, where the beam corresponds to at least one antenna port, and forms a beam direction by analog/digital/hybrid beamforming. The downlink beam transmit direction of the base station and receive direction of the UE are adjusted, so that a beam pair whose beam ID is 0 is formed through beam alignment.

The TRP 2 does not use the beam ID 0 to establish a downlink beam pair relationship with the UE.

The UE establishes a beam pair with the TRP 1, and it is specified that only the beam ID 0 is used as a reference for transmitting an uplink signal. In this way, an objective of allowing the UE to transmit an uplink signal to only the TRP 1 is achieved.

In still another possible manner, as specified in the protocol, the UE should use a CSI-RS antenna port in a CSI-RS resource ID specified in the protocol as a reference to determine spatial information of uplink transmission.

An advantage of the manner lies in that, if a plurality of beams need to be swept during beam sweeping, different CSI-RS resources are configured to sweep the plurality of beams, and therefore the beams may be distinguished by using the CSI-RS resources.

For example, as specified in the protocol, the UE uses an NZP CSI-RS resource ID 0 as a reference for the spatial information of uplink transmission.

When the base station performs a configuration, if a plurality of base stations cooperate, only a base station that needs to receive an uplink signal of the UE configures the NZP CSI-RS ID as 0; otherwise, configuring the NZP CSI-RS ID as 0 should be avoided.

The manner is applicable to a case in which the base station uses one NZP CSI-RS resource to manage one beam direction.

Both the TRP 1 and the TRP 2 may establish an alignment relationship of a downlink beam pair with the UE. If the base station expects the UE to transmit an uplink signal to only the TRP 1, the TRP 1 configures an NZP CSI-RS resource for the UE, where an ID of the resource is 0, and the resource corresponds to at least one antenna port. When the TRP 2 performs beam alignment with the UE, an ID of an NZP CSI-RS resource that is configured by the TRP 2 and in which a beam is located is different from that of the TRP 1.

At least one of a port number of an antenna port, a time-frequency resource location, and the like in the NZP CSI-RS resource configured by the TRP 1 is different from that configured by the TRP 2, so that the two NZP CSI-RS resources can be distinguished.

The antenna port number, the time-frequency resource location, or the like in each NZP CSI-RS resource may be delivered by using higher layer signaling.

The UE establishes a beam pair with the TRP 1, and it is specified that only the NZP CSI-RS resource ID 0 is used as a reference for transmitting an uplink signal. In this way, an objective of allowing the UE to transmit an uplink signal to only the TRP 1 is achieved.

It may be understood that, herein the reference for the spatial information of uplink transmission may also be a reference for an uplink analog beam and/or digital beamforming of the UE, or the like, and may be finally reflected as a reference for an uplink transmit angle. A signal (second signal) for uplink transmission includes at least one of an uplink control signal, an uplink data signal, and a reference signal. The uplink control signal is a physical uplink control channel PUCCH or the like. The uplink data signal is a physical uplink data channel PUSCH or the like. The reference signal is an SRS, a DMRS, or the like.

It may be understood that, when the protocol uses a predefined manner, the base station and the UE understand the specification consistently. The UE can use the downlink resource only as a reference for the uplink transmit direction, and the downlink resource can also be used by the TRP used only for uplink reception.

One of the foregoing manners predefined in the protocol may be defined, or a combination thereof may be defined. When a combination is defined, the base station and the UE need to understand the definition consistently during configurations.

By using at least one method in the foregoing 5b, 5c, and 5d, an objective of determining, by the UE, spatial information of the uplink signal can be achieved, and a process of beam sweeping and measuring for obtaining an uplink beam pair can be simplified or omitted.

Further, by using at least one method in 5b, 5c, and 5d, the UE can learn a spatial domain relationship between the first signal and the second signal. The spatial domain relationship includes spatial parameters mentioned in other parts of this application, for example, one or more of parameters such as a transmit angle (AoD), a dominant transmit angle (Dominant AoD), an average angle of arrival (Average AoA), an angle of arrival (AoA), a channel correlation matrix, a power azimuth spectrum of an angle of arrival, an average angle of departure (Average AoD), a power azimuth spectrum of an angle of departure, transmit channel correlation, receive channel correlation, transmit beamforming, receive beamforming, spatial channel correlation, a spatial filter, a spatial filter parameter, or a spatial receive parameter. Because a path loss and/or a timing advance are/is also related to a spatial domain relationship, on condition that the UE determines the first signal having a spatial domain relationship with the second signal, the UE may measure a downlink path loss by using a received power of the first signal, to determine an uplink transmit power of the second signal, or adjust a timing advance by using a receive time of the first signal, to determine a transmit time of the second signal. In this way, the UE can receive the first signal, and determine a relationship between the second signal and the first signal. Further, the UE can perform one or more of the following: determining, based on spatial information for receiving the first signal, corresponding spatial information for transmitting the second signal, determining the transmit power of the second signal based on the received power of the first signal, and determining the transmit time of the second signal based on the receive time of the first signal.

Specifically, the UE may obtain, according to at least one method in 5b, 5c, and 5d, spatial information for receiving a downlink signal, where the spatial information is used for determining spatial information for transmitting an uplink signal. Therefore, the UE obtains a correspondence between the downlink signal and the uplink signal. In principle, the correspondence is to instruct the UE to perform transmission in an appropriate spatial direction to facilitate reception by the base station. Uplink signals transmitted by the UE in different directions are subject to different path losses and propagation delays in a propagation process. As shown in FIG. 4, the TRP 1 and the TRP 2 are two transmission points, and the two transmission points may be transmission points in different geographical locations. Because distances from the UE to the two transmission points are not equal, path losses and propagation delays that uplink signals transmitted by the UE undergo are also different. In at least one method in 5b, 5c, and 5d, the UE determines spatial information of the second signal based on the first signal, where a principle is that a spatial propagation path of the first signal is highly related to a path of the second signal. Therefore, the path loss and propagation delay that the first signal undergoes in the propagation process may also be considered as highly related to the path loss and propagation delay that the second signal undergoes in the propagation process. Therefore, a correspondence between the first signal and the second signal may also be used by the UE to determine the path loss and propagation delay of the second signal.

Optionally, the first signal includes a non-zero-power reference signal.

Optionally, the non-zero-power reference signal included in the first signal is at least one of a non-zero-power reference signal used for obtaining channel state information, a non-zero-power reference signal used for demodulation, a non-zero-power reference signal used for beam management, a synchronization signal, and a tracking reference signal tracking RS used for time and frequency synchronization and tracking. For example, in an LTE system, a reference signal used for obtaining channel state information may be a channel state information-reference signal (CSI-RS), and a reference signal used for demodulation may be a demodulation reference signal (DMRS). In an NR system, a reference signal used for obtaining channel state information may be a CSI-RS, or may be another reference signal having a function of obtaining channel state information; a reference signal used for demodulation may be a DMRS, or may be another reference signal having a function of demodulation; a reference signal used for beam management may be a beam management reference signal (BMRS), and the reference signal used for beam management may be used for measuring a large-scale property of a beam, and further used for beam sweeping, alignment, and modification. For example, gains in the large-scale property are measured, and a beam pair with largest gains is used as a pair of beams.

Optionally, the second signal includes a reference signal. The reference signal may be a non-zero-power reference signal or may be a zero power reference signal.

Optionally, the reference signal included in the second signal is at least one of a reference signal used for demodulation and a reference signal used for uplink channel measurement. For example, in the LTE system, a reference signal used for demodulation may be a DMRS, and a reference signal used for uplink channel measurement may be a sounding reference signal (SRS). In the NR system, a reference signal used for demodulation may be a DMRS, or may be another reference signal having a function of demodulation; and a reference signal used for uplink channel measurement may be an SRS, or may be another reference signal having a function of uplink channel measurement.

In a possible implementation of this application, the UE may determine a transmit power of an uplink signal (including the second signal and/or a signal associated with the second signal) based on the received power of the first signal, and use the transmit power to transmit the uplink signal.

The signal associated with the second signal may include a signal having a non-empty intersection between an antenna port (also referred to as a port for short) of the signal and an antenna port of the second signal, where the signal may be an uplink data signal, and/or an uplink control signal, and/or a reference signal different from the second signal.

Optionally, for the signal associated with the second signal, a relationship between the signal and the second signal may be indicated in an explicit indication manner. For example, the base station transmits signaling to the UE, indicating that a signal is a signal associated with the second signal.

Specifically, this application provides a communication method. The method may include the following steps.

S801. A base station transmits, to UE, information used to indicate a transmit power of a first signal.

Correspondingly, the UE receives the information used to indicate the transmit power of the first signal.

Optionally, the indication manner may be that the base station transmits signaling to the UE by using an information element in RRC signaling, where the signaling indicates the transmit power of the first signal.

Optionally, the transmit power is a transmit power of the base station.

S802. The UE receives the first signal, and measures and obtains a received power of the first signal.

Optionally, the UE may perform smooth filtering on the received power of the first signal in a time window to obtain a filtered received power as the received power of the first signal.

When the first signal is a CSI-RS used for obtaining channel state information, the received power may also be referred to as a CSI-RS received power (RSRP, reference signal received power).

S803. The UE obtains a path loss of the first signal based on the transmit power of the first signal and the received power of the first signal that are notified by the base station.

Optionally, the received power of the first signal may be a reference signal received power.

Optionally, the path loss is equal to a difference obtained by subtracting a filtered reference signal received power from the transmit power.

S804. The UE determines an uplink transmit power based on the path loss or an open-loop control parameter related to the path loss, and uses the uplink transmit power to transmit an uplink signal. The using the uplink transmit power to transmit an uplink signal may be optional.

The uplink signal includes the second signal and/or a signal associated with the second signal. Optionally, the UE obtains a correspondence between the first signal and the second signal and/or the signal associated with the second signal. At least one method in 5c, 5d, and 5b may be performed to obtain the correspondence.

The signal associated with the second signal may include a signal having a non-empty intersection between an antenna port (also referred to as a port for short, port) of the signal and an antenna port of the second signal, where the signal may be an uplink data signal, and/or an uplink control signal, and/or a reference signal different from the second signal. For example, the second signal is an SRS, and the SRS has only one port, such as a port 12, but a PUSCH has four ports, such as ports 9 to 12; because the port of the SRS is one of the four ports of the PUSCH, the PUSCH may be considered as the signal associated with the second signal. For another example, the second signal is an SRS, and the SRS has two ports, such as a port 10 and a port 12, but a PUSCH has four ports, such as ports 7, 9, 11, and 12; because an intersection exists between the antenna ports of the SRS and the antenna ports of the PUSCH, that is, the port 12, the PUSCH may be considered as the signal associated with the second signal.

The signal associated with the second signal and the second signal are usually signals transmitted by using same or approximate spatial information.

Optionally, for the signal associated with the second signal, a relationship between the signal and the second signal may be indicated in an explicit indication manner. For example, the base station transmits signaling to the UE, indicating that a signal is a signal associated with the second signal.

Usually, the UE may obtain an uplink transmit power based on one or more of the open-loop control parameter, a closed-loop control parameter, a nominal power density expected by the base station, a signal bandwidth, and a maximum power limit. The open-loop control parameter may include the foregoing path loss.

This is equivalent to compensating the transmit power by the UE for the path loss, so that signal quality of the uplink signal (such as the second signal) that undergoes the path loss in a propagation process can meet a demodulation requirement of the base station.

Optionally, the path loss compensation may be reflected by a product of the path loss and a coefficient (also referred to as a compensation coefficient, a path loss compensation coefficient, a factor, a compensation factor, or a path loss compensation factor). The coefficient may be a non-negative number, and is configured by the base station for the UE, where the configuration may be cell-specific or UE-specific. When the coefficient is configured as 1, the UE compensates the transmit power of the second signal with all measured path losses of the first signal; when the coefficient is configured as 0, the UE does not compensate for any path loss; when the coefficient is configured as less than 1, the UE compensates the transmit power of the second signal with some of measured path losses of the first signal, and in this case, when the base station configures a compensation coefficient that is less than 1, interference to other users may be reduced when the second signal is received; or when the coefficient is configured as greater than 1, the UE compensates the transmit power of the second signal with measured path losses of the first signal excessively. The base station configures the compensation coefficient that is greater than 1, and this may compensate for asymmetry between beamforming on the base station side and beamforming on the UE side. Specifically, energy of beamforming signals transmitted and received by the base station is more concentrated on a radiation pattern, and main lobes are narrower; however, because antenna configurations of the UE are less massive than those of the base station, energy of beamforming signals transmitted and received by the UE is more scattered on a radiation pattern, and main lobes are wider. This causes concentrated distribution of energy of downlink signals in space. The UE can receive a narrow beam by using a wide beam and can better obtain a downlink signal, but the base station receives, by using a narrow beam, a wide uplink beam transmitted by the UE, and some energy is lost. Therefore, the base station configures the compensation coefficient that is greater than 1 for the UE, so that the UE can compensate for losses caused by the foregoing reasons.

The UE may measure the received power of the first signal to obtain the path loss (PL) of the first signal, and compensate the second signal for the path loss based on the path loss of the first signal. The UE compensates the transmit power of the second signal with alpha*PL, where alpha is a path loss compensation factor. After performing the path loss compensation, the UE transmits the second signal to the base station by using a transmit power meeting a maximum transmit power limit. The path loss compensation factor may be specified by a protocol, or preconfigured or prestored locally, or may be configured by the base station.

In another possible implementation of this application, the UE may determine and/or adjust a transmit time of the uplink signal based on a receive time of the first signal.

The uplink signal includes the second signal and/or the signal associated with the second signal.

For descriptions about the first signal, the second signal, the signal associated with the second signal, and the uplink signal, refer to the descriptions in the foregoing method.

Specifically, this application provides a communication method. The method may include the following steps.

S901. A base station transmits at least two first signals to a UE.

Correspondingly, the UE receives the first signals from the base station.

Optionally, the at least two first signals have same configuration information, and the configuration information may be used to indicate at least one of an antenna port used by a downlink signal, a time-frequency resource location, and an identifier of a resource in which the downlink signal is located.

S902. The UE determines a variation of a propagation delay of the first signal based on the at least two first signals.

Optionally, the variation of the propagation delay of the first signal may be a function of receive time of the at least two first signals, for example, a difference between receive time of two first signals in the at least two first signals, or an average value of a plurality of differences.

In this application, the receive time is a time, determined by the UE, at which a signal is received. A deviation may exist between the receive time and a time at which the signal actually arrives. For example, the receive time is a quantized time, and the receive time may also be referred to as a receive timing.

S903. The UE determines and/or adjusts a transmit time of an uplink signal based on the variation of the propagation delay of the first signal.

Optionally, the UE may adjust an uplink transmission timing advance (TA) based on the variation (also referred to as a change or an offset) of the propagation delay of the first signal. Because the transmit time of the uplink signal is related to the timing advance, this is equivalent to adjusting the transmit time of the uplink signal by the UE.

Optionally, Adjusted TA=Unadjusted TA+Offset. The offset may be a positive value or a negative value.

S904. The UE transmits the uplink signal based on the transmit time of the uplink signal.

Generally, the transmit time of the uplink signal may be determined by the base station. The base station may determine, by using a signal transmitted by the UE, for example, a preamble signal preamble, an uplink channel sounding signal SRS, or an uplink dedicated signal used for demodulation DMRS, a propagation delay that the signal transmitted by the UE undergoes in a propagation process. The base station may determine, by measuring the propagation delay of the signal, a time adjustment for transmitting the uplink signal by the UE, where the time adjustment may be indicated by an uplink timing advance. By using a timing advance indication, the base station expects that the signal transmitted by the UE and undergoing the propagation delay in the propagation process can arrive at the base station at a time expected by the base station, so that interference to other UEs in a cell is reduced. Specifically, the base station may adjust a time of transmitting an uplink signal by the UE, so that UEs are orthogonal to each other in time-frequency domain and spatial domain. For a plurality of UEs orthogonal to each other in time-frequency domain, if a time when the signal transmitted by the UE arrives at the base station overlaps a time when a signal transmitted by another UE in the plurality of UEs arrives at the base station, the UEs that should be orthogonal at the same time overlap each other, causing interference. Therefore, the uplink signal transmitted by the UE should meet a delay requirement expected by the base station.

When the base station notifies the UE of the timing advance by using a Media Access Control (MAC) layer information element, a time is required between two transmissions of MAC layer information elements. When no timing advance notification delivered by the base station is received, the UE itself may adjust and update the timing advance based on the receive time of the downlink signal (first signal). Specifically, the UE may measure a time difference between receive timings of two first signals to obtain a difference between receive timings of downlink signals, infer a change of a propagation delay that the downlink signal undergoes, and use the change of the propagation delay to adjust the uplink transmission timing advance.

In S904, the UE may transmit, based on the transmit time of the uplink signal, a second signal of a time domain unit corresponding to the transmit time, where the time domain unit may be one or more of a subframe, a timeslot (slot), a symbol (such as an OFDM symbol), or a mini-timeslot (minislot).

Optionally, after adjusting the uplink transmission timing advance, the UE may update a maintained or stored uplink transmission timing advance.

Further, optionally, the UE may report an uplink transmission timing advance, for example, an adjusted uplink transmission timing advance. Alternatively, the UE may report information related to the uplink transmission timing advance, where the information is a value of a function corresponding to the uplink transmission timing advance. When the UE needs to maintain a plurality of uplink timing advances, the UE may report a plurality of uplink timing advances, or a plurality of pieces of information related to uplink transmission timing advances, or information related to a plurality of uplink transmission timing advances. Specifically, the UE may report a difference between at least two of the plurality of uplink timing advances or a function of differences. The function of the differences may be an FFT/IFFT function between a time domain difference and a frequency domain phase offset corresponding to the time domain difference. The UE may report, to at least one of a first network device and a second network device, an uplink transmission timing advance of an uplink signal corresponding to at least one of the first network device and the second network device, or information related to an uplink transmission timing advance. A correspondence exists between the uplink transmission timing advance reported by the UE, or the information related to the uplink transmission timing advance, and a first signal corresponding to the first network device, and/or a first signal corresponding to the second network device.

For example, in a first time domain unit slot 1 and a second time domain unit slot 2, the UE receives first signals of the slot 1 and the slot 2. The slot 1 is an example of the first time domain unit, and the slot 2 is an example of the second time domain unit. When receiving a downlink signal, the UE may perform synchronous timing based on a location of a physical signal such as a pilot to obtain an arrival timing t1 of the first signal of the slot 1 and an arrival timing t2 of the first signal of the slot 2. The UE may obtain a change of a propagation delay of the downlink signal based on a time difference between t1 and t2. For example, a duration of the time domain unit slot may be t0, for example, t0 =0.5 ms. There are N slot durations from the slot 1 to the slot 2, where N is a quantity of time domain units between the slot 1 and the slot 2. The UE may obtain, based on a result of calculating t2−t1−N*t0, how much the downlink propagation delay of the first signal changes from the slot 1 to the slot 2. Usually, the base station transmits a timing advance command, notifying the UE of a timing advance needed for transmitting an uplink signal, and the UE should record and maintain the corresponding timing advance TA. When the UE has not received the timing advance command, the UE may adjust a currently maintained TA based on the change of the propagation delay of the first signal. An adjusted TA is equal to an unadjusted TA plus a variation of the propagation delay of the first signal. The UE adjusts the TA, and transmits a second signal based on the adjusted TA.

Figure 6:
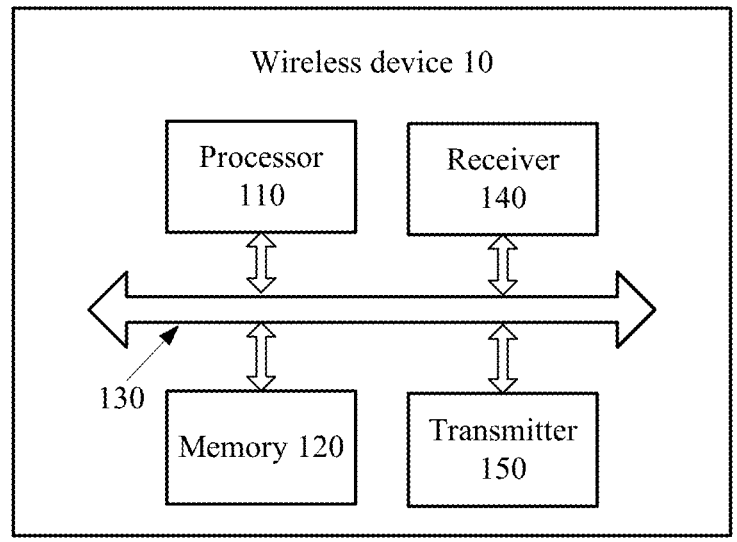
FIG. 6 is a schematic diagram of a signal transmission apparatus (for example, a wireless network device) according to an embodiment of the present application.

Based on the foregoing method, as shown in FIG. 6, an embodiment of the present application further provides a signal transmission apparatus, where the apparatus may be a wireless device 10. The wireless device 10 may correspond to the first wireless network device or the second wireless network device in the foregoing method. The first wireless network device may be a base station (such as a TRP), or may be another device, and is not limited herein. The second wireless network device may be a base station (such as a TRP), or may be another device, and is not limited herein.

The apparatus may include a processor 110, a memory 120, a bus system 130, a receiver 140, and a transmitter 150. The processor 110, the memory 120, the receiver 140, and the transmitter 150 are connected by the bus system 130. The memory 120 is configured to store an instruction. The processor 110 is configured to execute the instruction stored in the memory 120 to control the receiver 140 to receive a signal and control the transmitter 150 to transmit a signal, and complete steps of the first wireless network device (such as a base station) and the second wireless network device in the foregoing method. The receiver 140 and the transmitter 150 may be a same physical entity or different physical entities. When the receiver 140 and the transmitter 150 are the same physical entity, they may be collectively referred to as a transceiver. The memory 120 may be integrated in the processor 110, or may be disposed separately from the processor 110.

In an implementation, it may be considered that functions of the receiver 140 and the transmitter 150 are implemented by a transceiver circuit or a dedicated transceiver chip. It may be considered that the processor 110 is implemented by a dedicated processing chip, a processing circuit, a processor, or a general purpose chip.

In another implementation, it may be considered that the wireless device provided by this embodiment of the present application is implemented by using a general purpose computer. To be specific, program code of functions of the processor 110, the receiver 140, and the transmitter 150 is stored in the memory; and the general purpose processor implements the functions of the processor 110, the receiver 140, and the transmitter 150 by executing the code in the memory.

For concepts, explanations, and detailed descriptions related to the technical solution provided by this embodiment of the present application, used in the apparatus, and other steps, refer to descriptions about the content in the foregoing method or other embodiments. Details are not described again herein.

Figure 7:
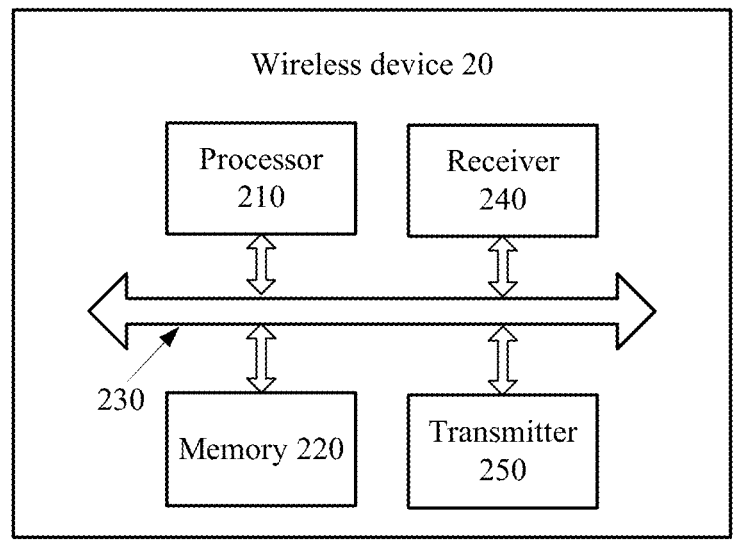
FIG. 7 is a schematic diagram of another signal transmission apparatus (for example, a user equipment) according to an embodiment of the present application.

Based on the foregoing method, as shown in FIG. 7, an embodiment of the present application further provides another signal transmission apparatus, where the apparatus may be a wireless device 20. The wireless device 20 corresponds to the user equipment in the foregoing method.

The apparatus may include a processor 210, a memory 220, a bus system 230, a receiver 240, and a transmitter 250. The processor 210, the memory 220, the receiver 240, and the transmitter 250 are connected by the bus system 230. The memory 220 is configured to store an instruction. The processor 210 is configured to execute the instruction stored in the memory 220 to control the receiver 240 to receive a signal and control the transmitter 250 to transmit a signal, and to complete steps of the user equipment in the foregoing method. The receiver 240 and the transmitter 250 may be a same physical entity or different physical entities. When the receiver 240 and the transmitter 250 are the same physical entity, they may be collectively referred to as a transceiver. The memory 220 may be integrated in the processor 210, or may be disposed separately from the processor 210.

In an implementation, it may be considered that functions of the receiver 240 and the transmitter 250 are implemented by a transceiver circuit or a dedicated transceiver chip. It may be considered that the processor 210 is implemented by a dedicated processing chip, a processing circuit, a processor, or a general purpose chip.

In another implementation, it may be considered that the wireless device provided by this embodiment of the present application is implemented by using a general purpose computer. To be specific, program code of functions of the processor 210, the receiver 240, and the transmitter 250 is stored in the memory; and the general purpose processor implements the functions of the processor 210, the receiver 240, and the transmitter 250 by executing the code in the memory.

For concepts, explanations, and detailed descriptions related to the technical solution provided by this embodiment of the present application, used in the apparatus, and other steps, refer to descriptions about the content in the foregoing method or other embodiments. Details are not described again herein.

Based on the method provided by embodiments of the present application, an embodiment of the present application further provides a communications system, where the communications system includes the foregoing first wireless network device and second wireless network device, and may further include one or more of the foregoing user equipments.

It should be understood that in embodiments of the present application, the processor 110 or 210 may be a central processing unit (CPU), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

The memory 120 or 220 may include a read-only memory and a random access memory, and provide an instruction and data to the processor 310. A part of the memory may further include a non-volatile random access memory. For example, the memory may further store information of a device type.

The bus system 130 or 230 may further include a power bus, a control bus, a status signal bus, and the like, in addition to a data bus. However, for clear description, various types of buses in the figure are marked as the bus system.

In an implementation process, steps in the foregoing methods can be implemented by using a hardware integrated logical circuit in the processor 110 or 210, or by using instructions in a form of software. The steps of the method disclosed with reference to embodiments of the present application may be directly performed by a hardware processor, or may be performed by using a combination of hardware in the processor and a software module. A software module may be located in a storage medium, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should also be understood that, the terms "first", "second", "third", "fourth", and various numbers in this specification are used for distinguishing for ease of description only, and are not intended to limit the scope of embodiments of the present application.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not necessarily mean execution sequences in various embodiments of this application. The execution sequences of the processes should be determined according to functions and internal logic of the processes, and should not be construed as any limitation on the implementation processes of embodiments of the present application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed systems, apparatuses, and methods may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve objectives of solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, technical solutions of this application may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a Universal Serial Bus (USB) flash drive, a removable hard disk, a read-only memory (ROM), a random access memory (RAM), a magnetic disk, or an optical disc.

The foregoing descriptions are merely exemplary implementations of this application, and are not intended to limit the protection scope of this application. Any variation or replacement readily figured out by a person skilled in the art within the technical scope disclosed in this application may fall within the protection scope of this application.

What is claimed is:
1. A signal transmission method comprising:
receiving, by a user equipment (UE), indication information from a second wireless network device, wherein the indication information indicates that spatial information of a first signal is a reference for spatial information of an uplink control signal, wherein the first signal comprises: a non-zero-power reference signal for obtaining channel state information or a synchronization signal;

receiving, by the UE, the first signal from the second wireless network device;

determining, by the UE, the spatial information of the uplink control signal according to the spatial information of the received first signal; and transmitting, by the UE, the uplink control signal according to the determined spatial information of the uplink control signal.

2. The method according to claim 1, wherein the indication information comprises an identifier of the first signal.

3. The method according to claim 1, wherein the indication information is carried in radio resource control (RRC) signaling.

4. The method according to claim 1, further comprising:
determining spatial information of an uplink data signal to be transmitted by the UE according to the spatial information of the uplink control signal.

5. The method according to claim 4, further comprising:
determining a transmit power of the uplink data signal to be transmitted by the UE based on a received power of the first signal.

6. The method according to claim 5, wherein determining the transmit power of the uplink data signal based on the received power of the first signal comprises:

receiving information indicating a transmit power of the first signal, wherein the information is carried in an information element in radio resource control (RRC) signaling;

receiving the first signal, and measuring and obtaining the received power of the first signal;

obtaining a path loss of the first signal based on the received power of the first signal and the transmit power of the first signal, wherein the path loss is equal to a difference between the transmit power and a filtered reference signal received power; and determining, based on the path loss or an open-loop control parameter related to the path loss, an uplink transmit power for transmitting the uplink data signal.

7. An apparatus comprising a processor, coupled with a memory, wherein the processor is configured to execute instructions stored in the memory to cause the apparatus to perform:

receiving indication information from a second wireless network device, wherein the indication information indicates that spatial information of a first signal is a reference for spatial information of an uplink control signal, wherein the first signal comprises: a non-zero-power reference signal for obtaining channel state information or a synchronization signal;

receiving the first signal from the second wireless network device;

determining the spatial information of the uplink control signal according to the spatial information of the received first signal; and transmitting the uplink control signal according to the determined spatial information of the uplink control signal.

8. The apparatus according to claim 7, wherein the indication information comprises an identifier of the first signal.

9. The apparatus according to claim 7, wherein the indication information is carried in radio resource control (RRC) signaling.

10. The apparatus according to claim 7, wherein the processor is further configured to execute instructions stored in the memory to cause the apparatus to perform:
determining spatial information of a to-be-transmitted uplink data signal according to the spatial information of the uplink control signal.

11. The apparatus according to claim 10, wherein the processor is further configured to execute instructions stored in the memory to cause the apparatus to perform:
determining a transmit power of the to-be-transmitted uplink data signal based on a received power of the first signal.

12. The apparatus according to claim 11, wherein determining the transmit power of the to-be-transmitted uplink data signal based on the received power of the first signal comprises:

receiving information indicating a transmit power of the first signal, wherein the information is carried in an information element in radio resource control (RRC) signaling;

measuring and obtaining the received power of the first signal;

obtaining a path loss of the first signal based on the received power of the first signal and the transmit power of the first signal, wherein the path loss is equal to a difference between the transmit power and a filtered reference signal received power; and determining, based on the path loss or an open-loop control parameter related to the path loss, an uplink transmit power for transmitting the uplink data signal.

13. A non-transitory processor-readable storage medium having processor-executable instructions stored thereon, wherein the processor-executable instructions, when executed, facilitate:

receiving indication information from a second wireless network device, wherein the indication information indicates that spatial information of a first signal is a reference for spatial information of an uplink control signal, wherein the first signal comprises: a non-zero-power reference signal for obtaining channel state information or a synchronization signal;

receiving the first signal from the second wireless network device;

determining the spatial information of the uplink control signal according to the spatial information of the received first signal; and transmitting the uplink control signal according to the determined spatial information of the uplink control signal.

14. The non-transitory processor-readable storage medium according to claim 13, wherein the indication information comprises an identifier of the first signal.

15. The non-transitory processor-readable storage medium according to claim 13, wherein the indication information is carried in radio resource control (RRC) signaling.

16. The non-transitory processor-readable storage medium according to claim 13, wherein the processor-executable instructions, when executed, further facilitate:
determining spatial information of a to-be-transmitted uplink data signal according to the spatial information of the uplink control signal.

17. The non-transitory processor-readable storage medium according to claim 16, wherein the processor-executable instructions, when executed, further facilitate:

determining a transmit power of the to-be-transmitted uplink data signal based on a received power of the first signal.

18. The non-transitory processor-readable storage medium according to claim 17, wherein determining the transmit power of the to-be-transmitted uplink data signal based on the received power of the first signal comprises:
receiving information indicating a transmit power of the first signal, wherein the information is carried in an information element in radio resource control (RRC) signaling;
measuring and obtaining the received power of the first signal;
obtaining a path loss of the first signal based on the received power of the first signal and the transmit power of the first signal, wherein the path loss is equal to a difference between the transmit power and a filtered reference signal received power; and
determining, based on the path loss or an open-loop control parameter related to the path loss, an uplink transmit power for transmitting the uplink data signal.

\* \* \* \* \*